United States Patent [19]

Bustini et al.

[11] Patent Number: 5,313,454
[45] Date of Patent: May 17, 1994

[54] CONGESTION CONTROL FOR CELL NETWORKS

[75] Inventors: Lionel A. Bustini, Campbell; Patrick D. Daley, Belmont; Charles M. Corbalis, Milpitas, all of Calif.

[73] Assignee: Stratacom, Inc., San Jose, Calif.

[21] Appl. No.: 861,761

[22] Filed: Apr. 1, 1992

[51] Int. Cl.$^5$ .................. H04L 12/56; H04L 12/02
[52] U.S. Cl. ................................. 370/13; 370/60; 370/60.1; 370/94.1; 370/94.2
[58] Field of Search ............... 370/13, 17, 94.1, 94.2, 370/94.3, 60, 60.1, 58.1, 58.2, 58.3

[56] References Cited

U.S. PATENT DOCUMENTS

| | | | |
|---|---|---|---|
| 3,988,545 | 10/1976 | Kuemmerle et al. | 370/60 |
| 4,238,851 | 12/1980 | Takahashi et al. | 370/94.1 |
| 4,475,192 | 10/1984 | Fernow et al. | 370/17 |
| 4,491,943 | 1/1985 | Turner | 370/13 |
| 4,494,230 | 1/1985 | Turner | 370/60 |
| 4,499,576 | 2/1985 | Fraser | 370/60 |
| 4,506,358 | 3/1985 | Montgomery | 370/60 |
| 4,561,090 | 12/1985 | Turner | 370/60 |
| 4,644,533 | 2/1987 | Braff et al. | 370/60 |
| 4,703,475 | 10/1987 | Dretzka et al. | 370/60 |
| 4,703,477 | 10/1987 | Adelmann et al. | 370/94.1 |
| 4,757,529 | 7/1988 | Glapa et al. | 370/60 |
| 4,771,424 | 9/1988 | Suzuki et al. | 370/60.1 |
| 4,771,425 | 9/1988 | Baran et al. | 370/94.1 |
| 4,819,228 | 4/1989 | Baran et al. | 370/94.1 |
| 4,819,230 | 4/1989 | Calvignac et al. | 370/94.1 |
| 4,839,891 | 6/1989 | Kobayashi et al. | 370/94.1 |
| 4,903,261 | 2/1990 | Baran et al. | 370/94.2 |
| 4,905,233 | 2/1990 | Cain et al. | 370/94.1 |
| 4,914,650 | 4/1990 | Sriram | 370/60 |
| 4,939,718 | 7/1990 | Servel et al. | 370/60 |
| 4,974,224 | 11/1990 | Boone | 370/94.1 |
| 5,020,058 | 5/1991 | Holden et al. | 370/109 |
| 5,072,449 | 12/1991 | Enns et al. | 370/94.2 |
| 5,088,032 | 2/1992 | Bosack | 395/200 |
| 5,115,431 | 5/1992 | Williams et al. | 370/94.1 |

OTHER PUBLICATIONS

K. K. Ramakrishnan and R. Jain, "A Binary Feedback Scheme for Congestion Avoidance in Computer Networks," ACM Transactions on Computer System, vol. 8, pp. 158-181 (May, 1990).

K. W. Fendick, D. Mitra, I. Mitrani, M. A. Rodrigues, J. B. Seery, and A. Weiss, "An Approach to High-Performance, High-Speed Data Networks," IEEE Communications Magazine, pp. 74-82 (Oct. 1991).

C. Anthony Cooper and Kun I. Park, "Toward a Broadband Congestion Control Strategy," IEEE Network Magazine, pp. 18-23 (May 1990).

K. Bala, I. Cidon and K. Sohraby, "Congestion Control for High Speed Packet Swtiched Networks," IEEE, pp. 520-526 (1990).

IPX System Operation Guide, StrataCom, Inc., pp. 2-1 through 2-18 (1988).

The IPX Product Family System Description, StrataCom, Inc., pp. 1-114 (1990).

Primary Examiner—Wellington Chin
Attorney, Agent, or Firm—Blakely, Sokoloff, Taylor & Zafman

[57] ABSTRACT

A feedback control system for congestion prevention in a cell (packet) switching communication network is described. Congestion control is accomplished by controlling the transmission rate of bursty traffic in the presence of high priority, voice, low speed statistical, high speed deterministic and multicast data. Because bursty traffic is relatively insensitive to delay, adequate buffer capacity can be provided at the network nodes in order to minimize bursty data cell loss. By monitoring the buffer queue lengths at the nodes, a control signal can be generated at each intermediate node indicating the state of congestion. Excess queue length indicates incipient congestion while short queue lengths indicate excess capacity. Queue status is forwarded to the destination node where it is interpreted and sent back to the source node as a feedback rate control signal using a 2-bit code. The source node regulates the rate of bursty data transmission over the cell network in accordance with the feedback control signal thus minimizing congestion and concomitant data loss while efficiently utilizing available network bandwidth.

47 Claims, 15 Drawing Sheets

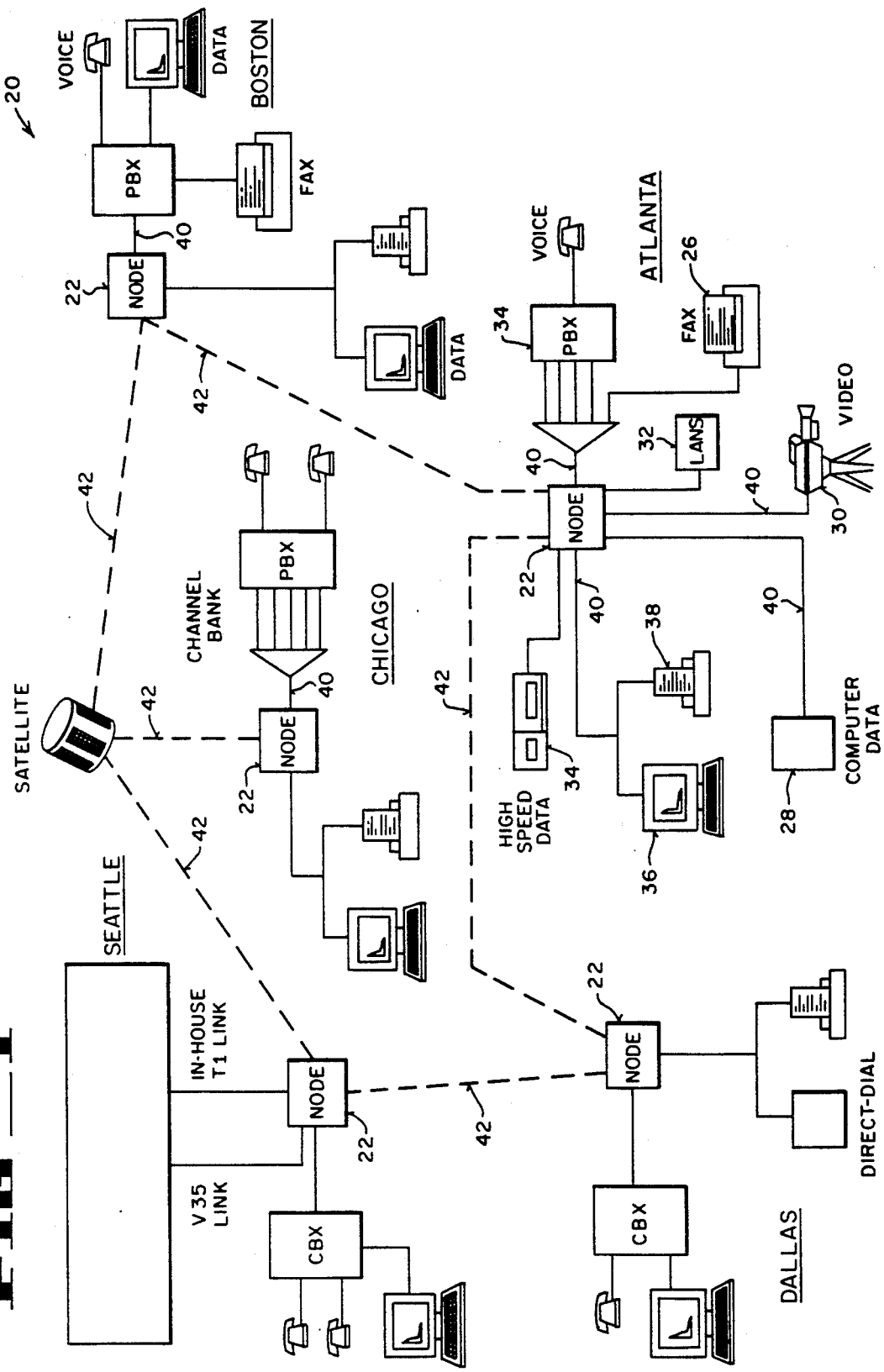
FIG_1

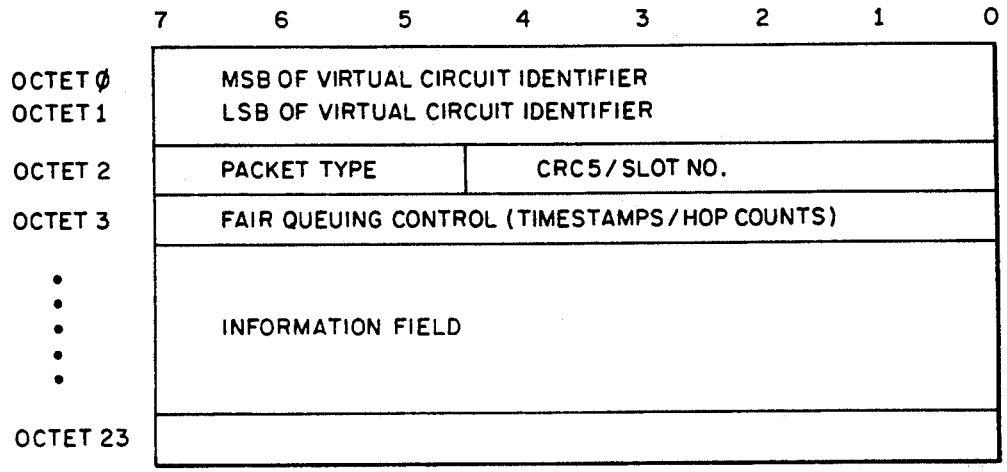
FIG_2
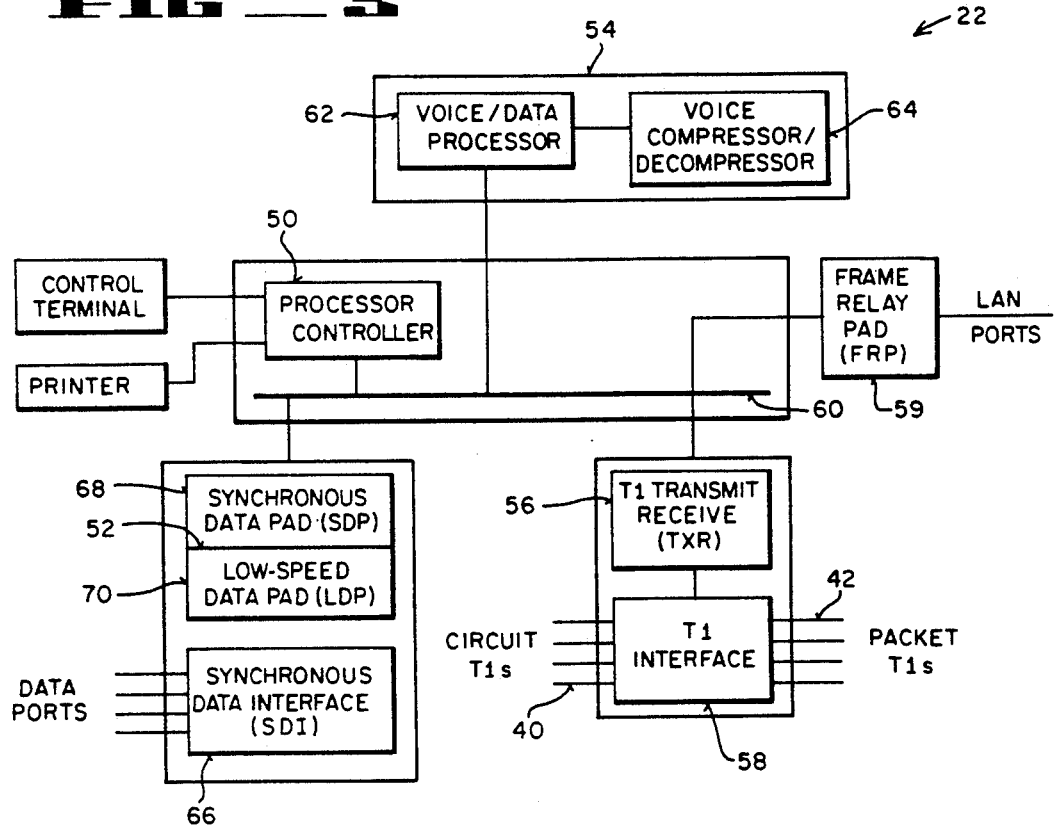
FIG_3

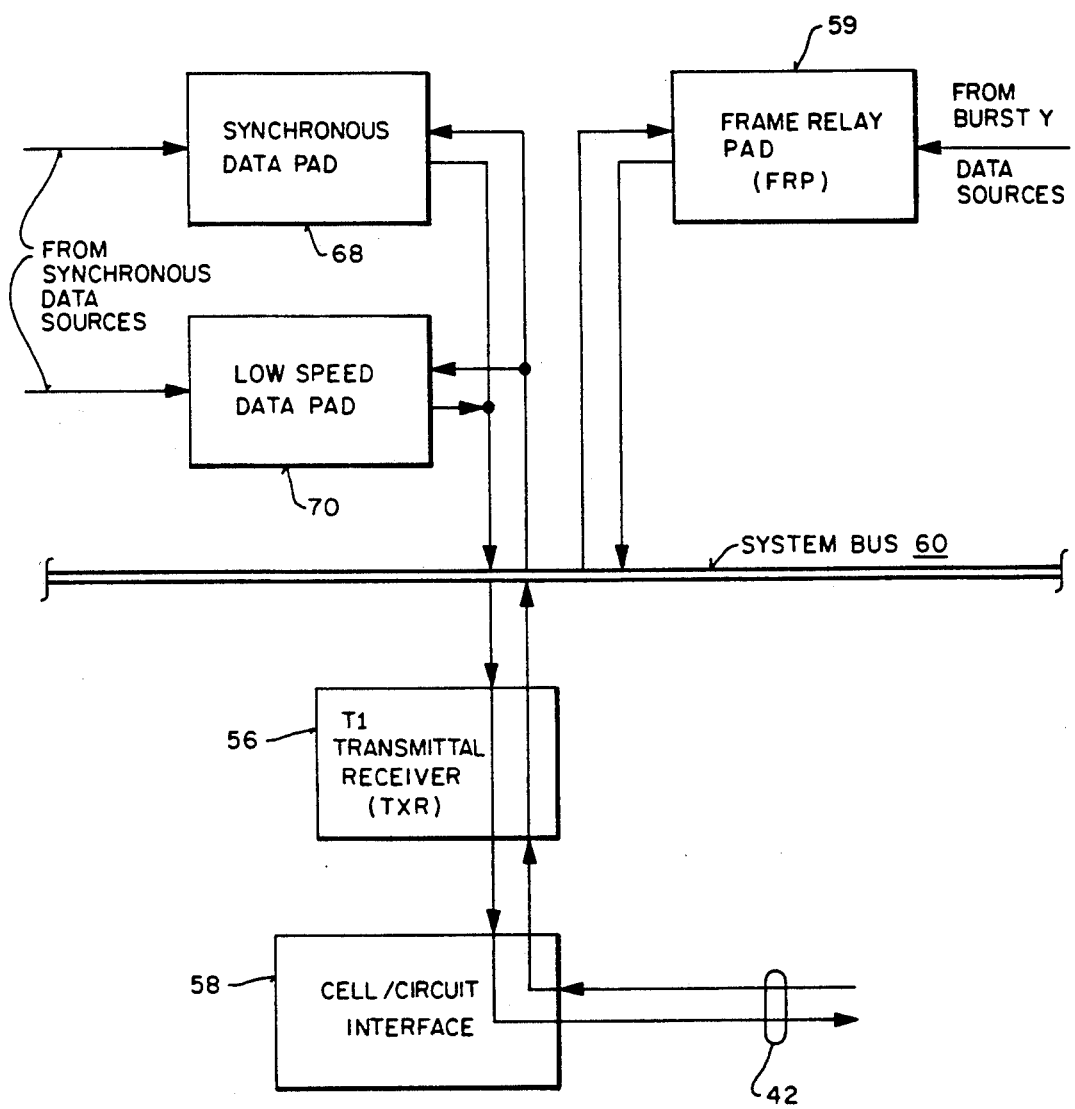

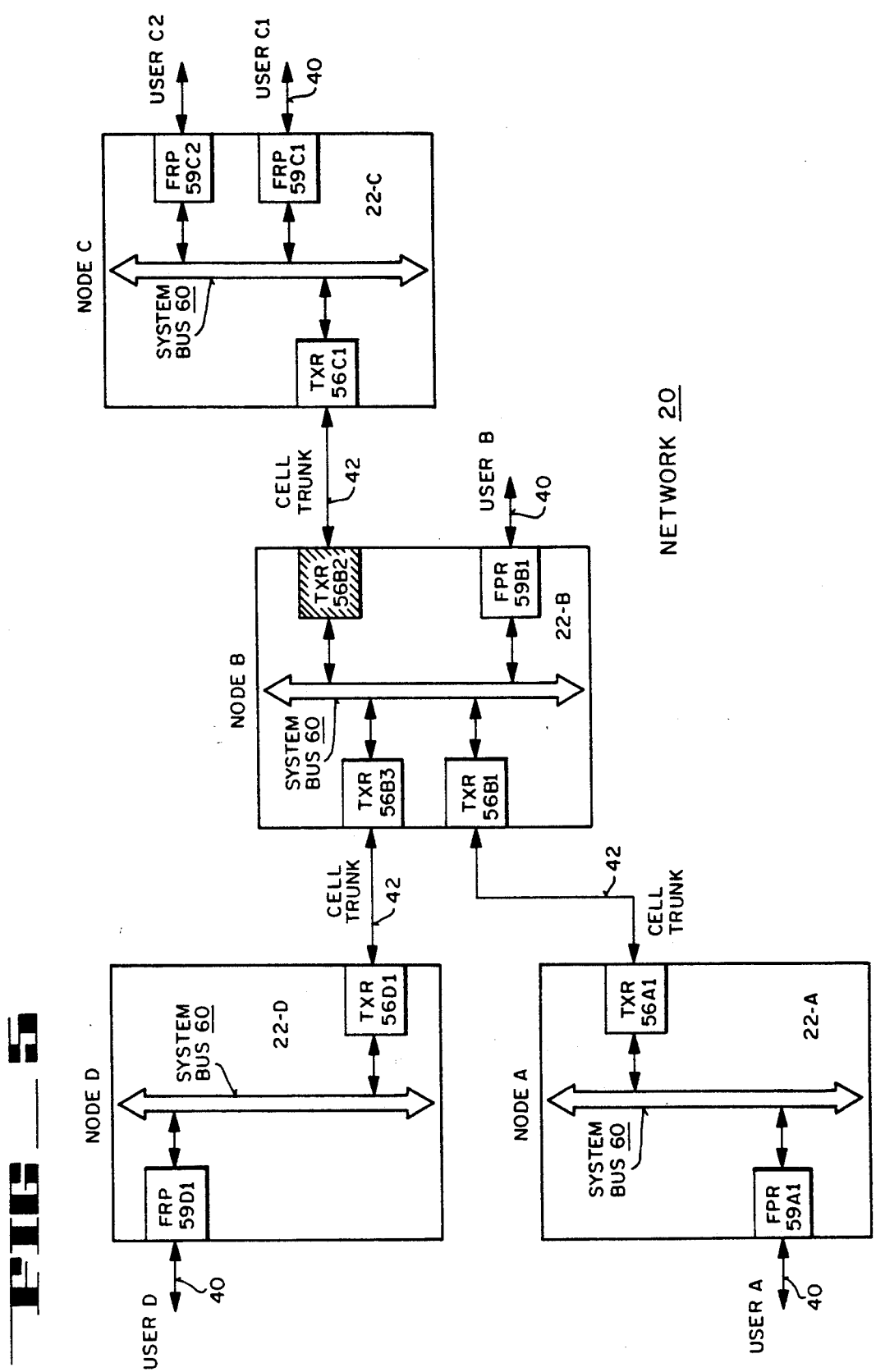

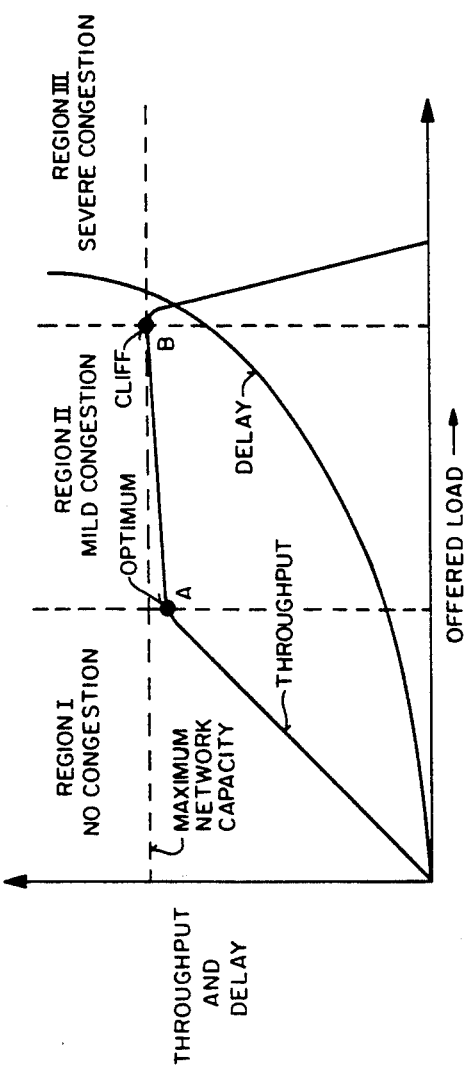
FIG.—6
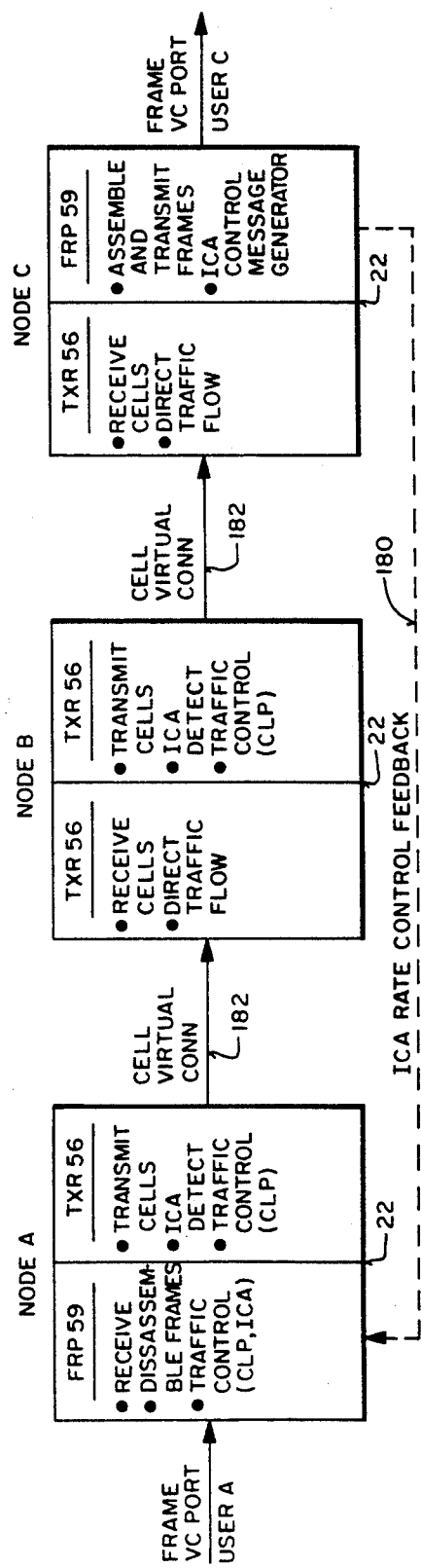
FIG.—7

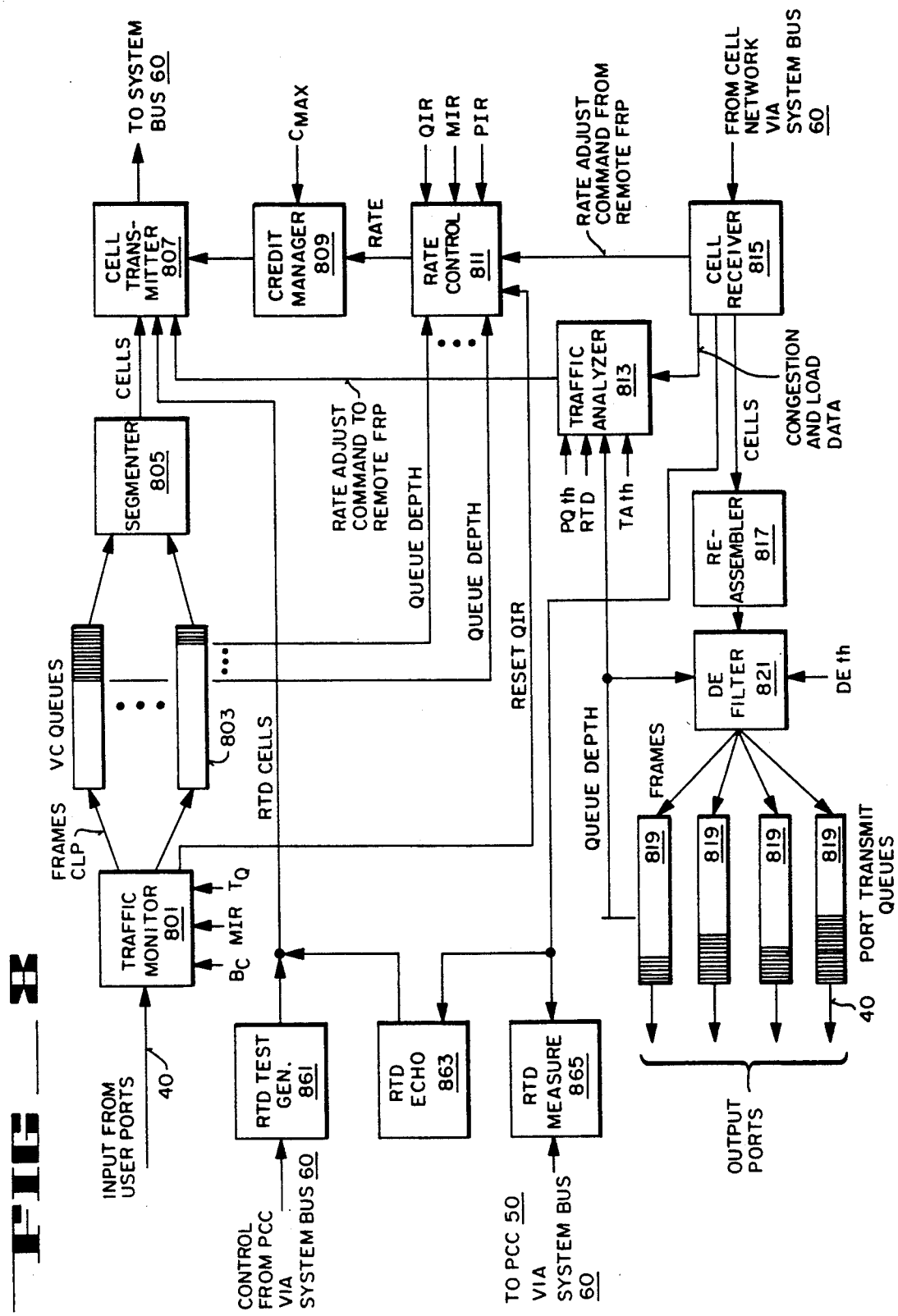

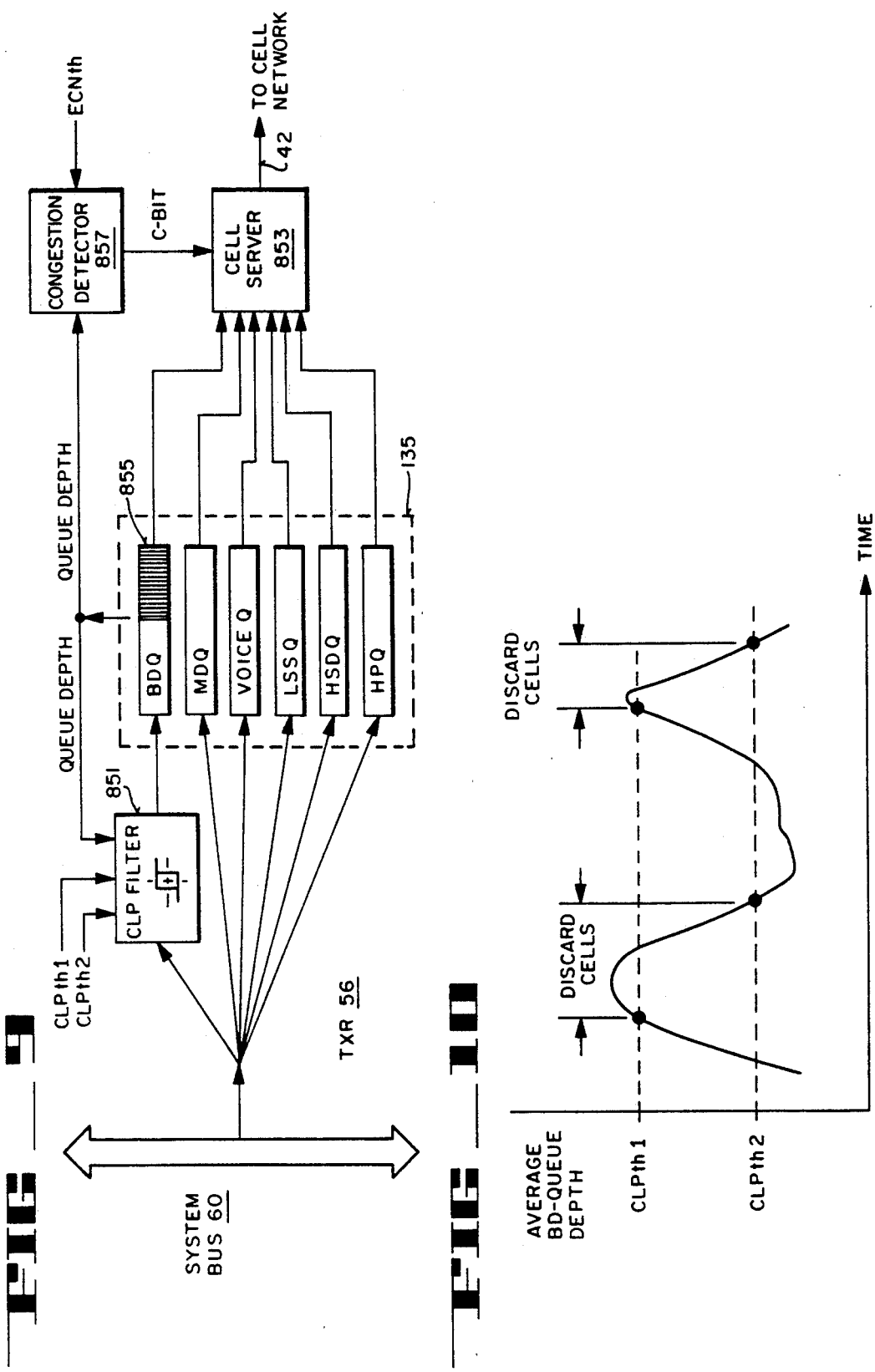

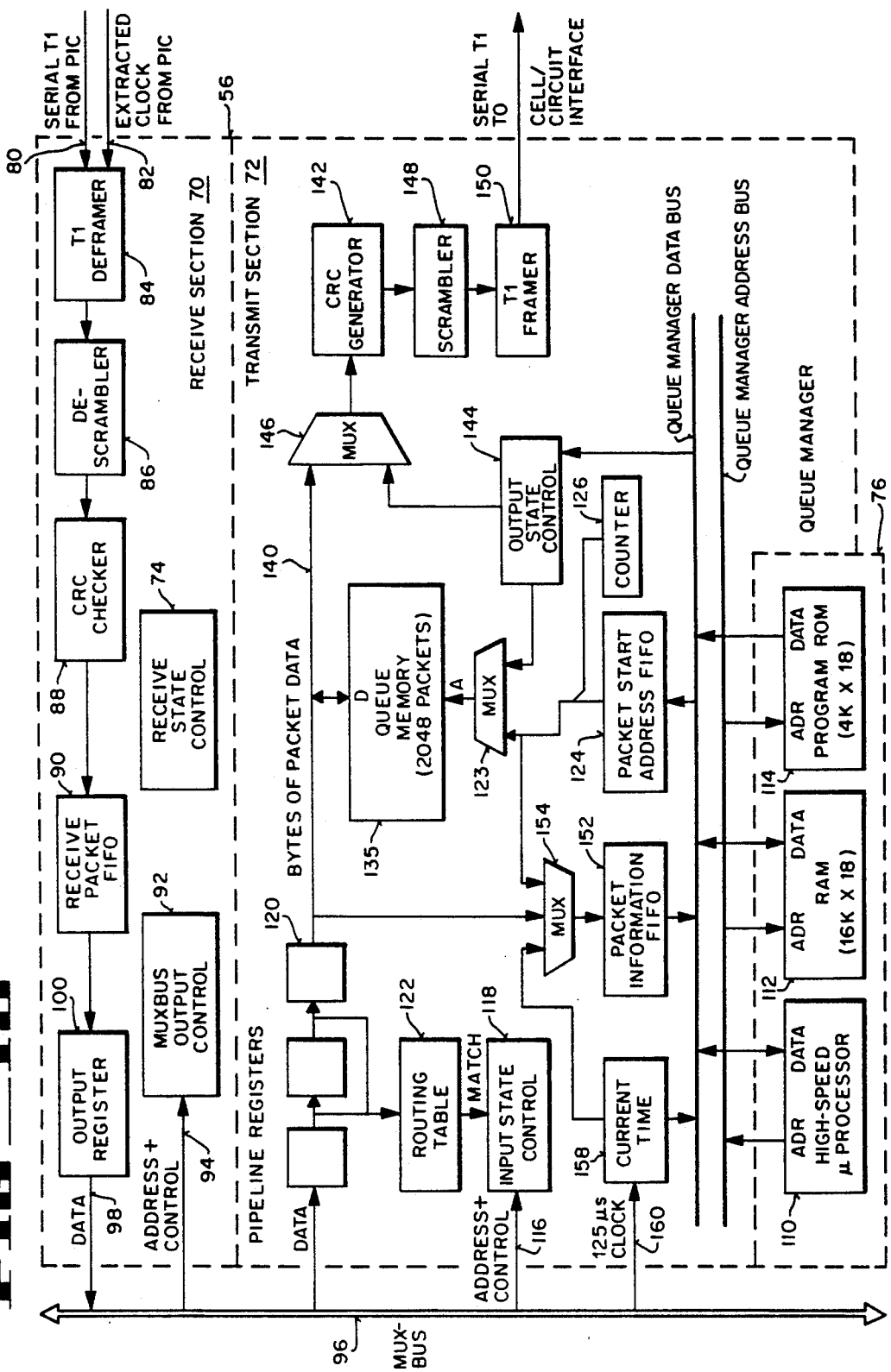
FIG._12

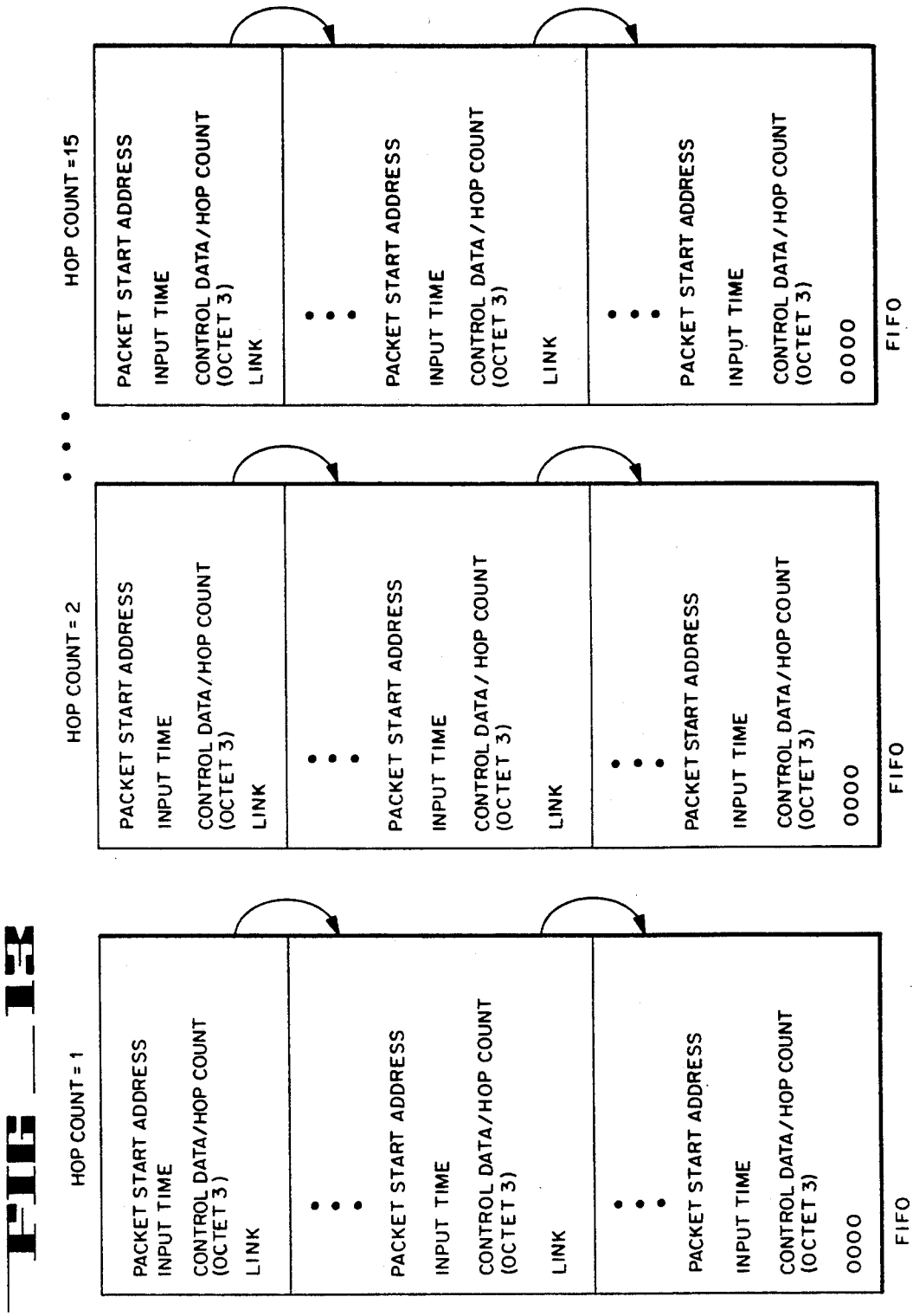
FIG_13

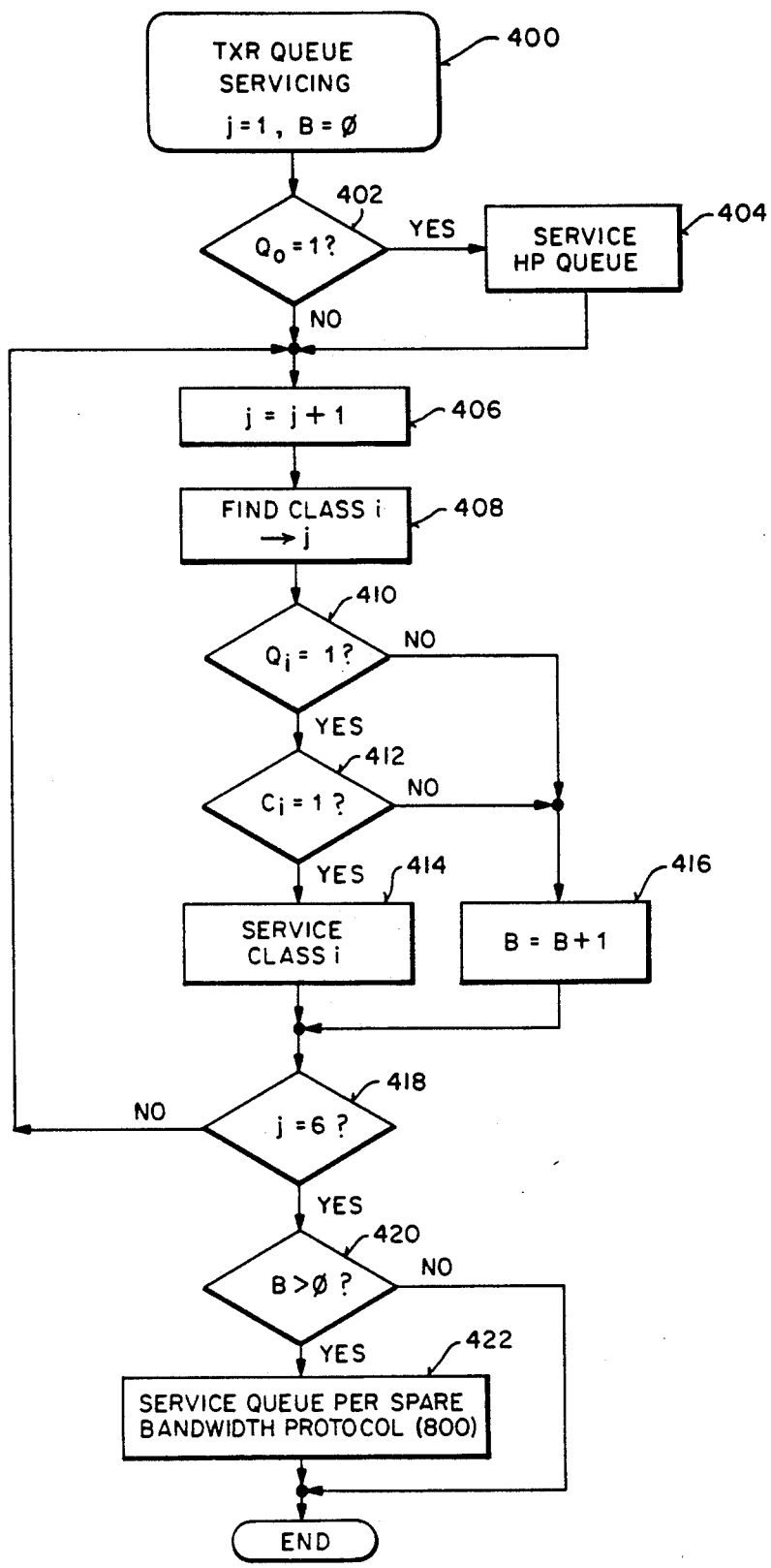
FIG_14A

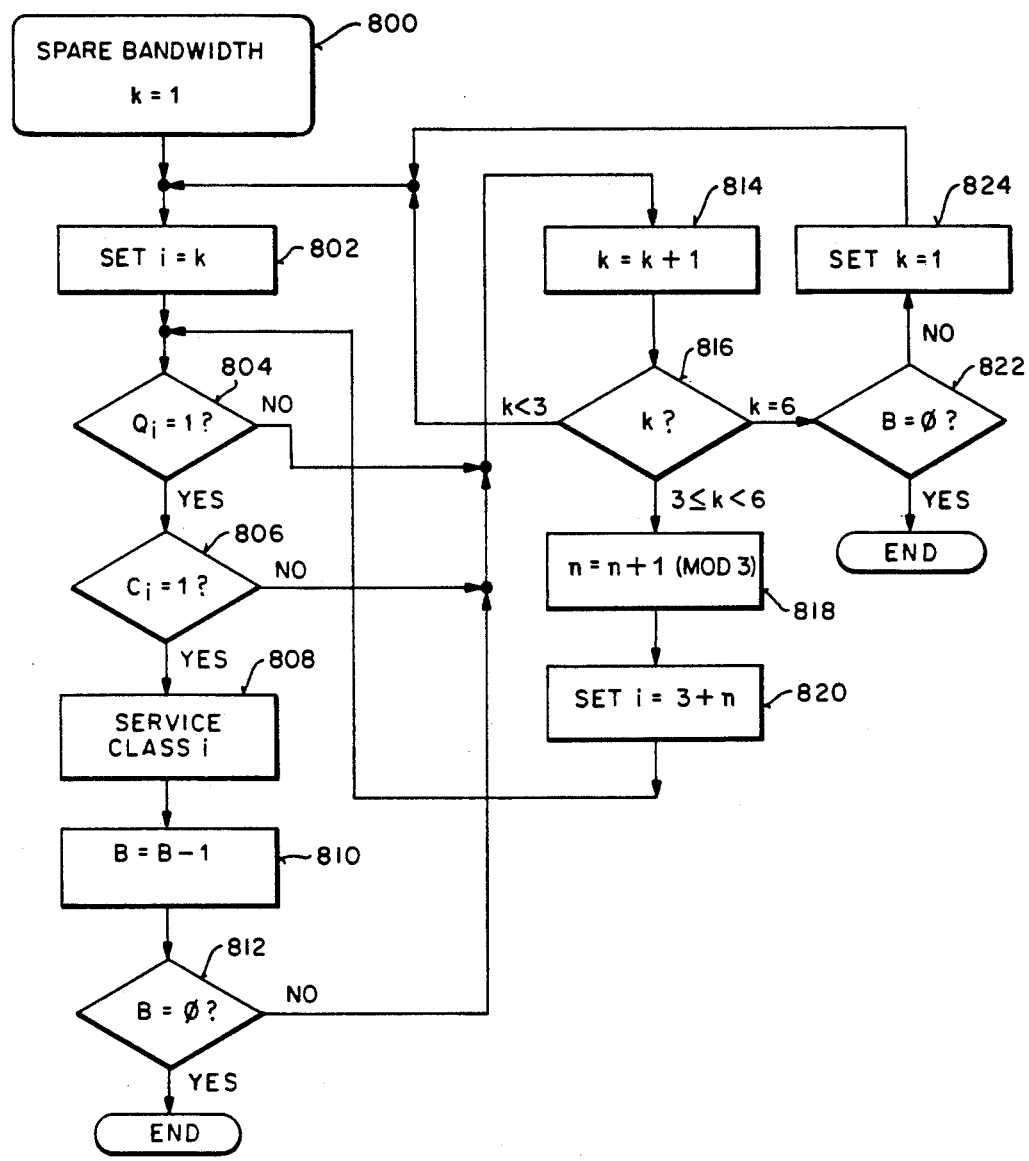
FIG_14B

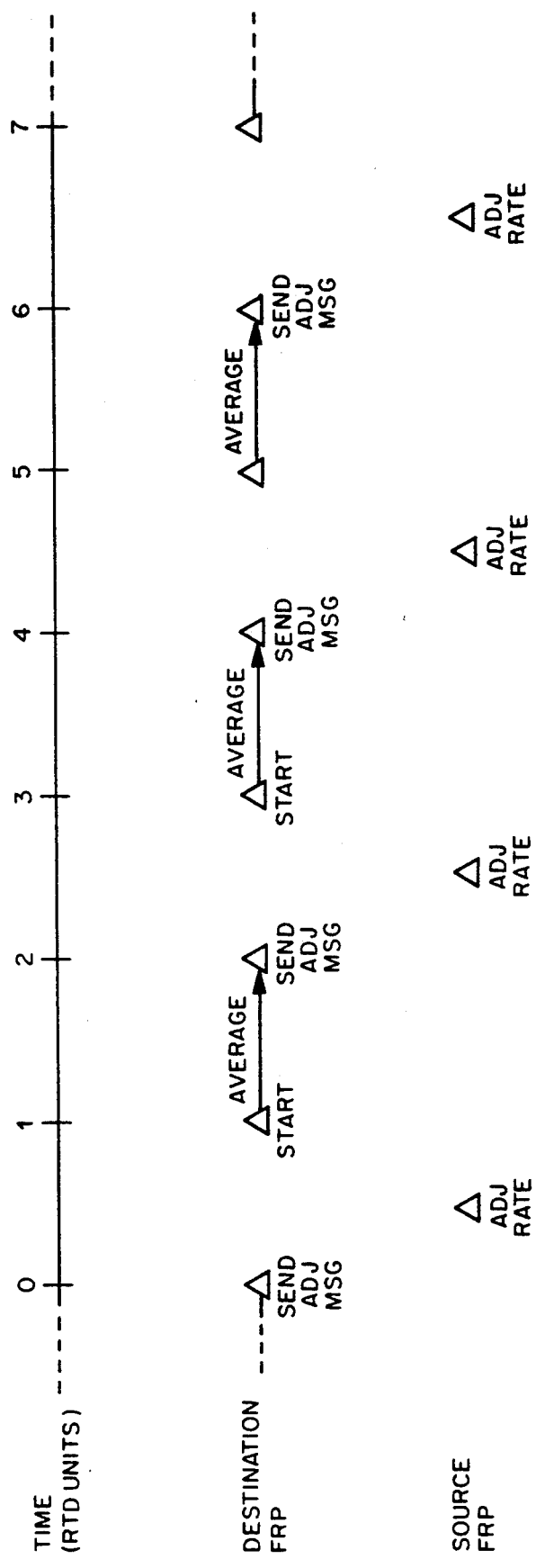

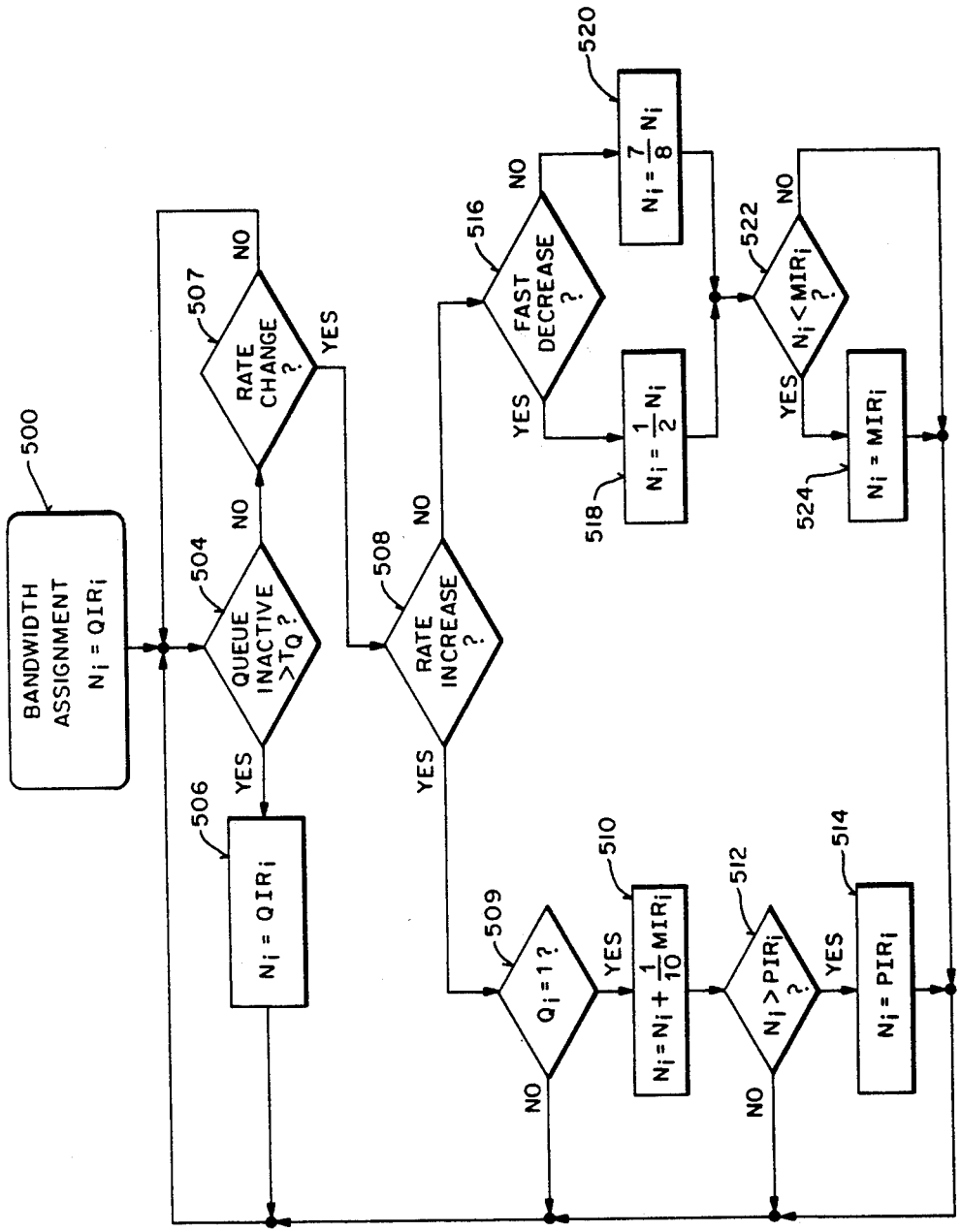
FIG_16

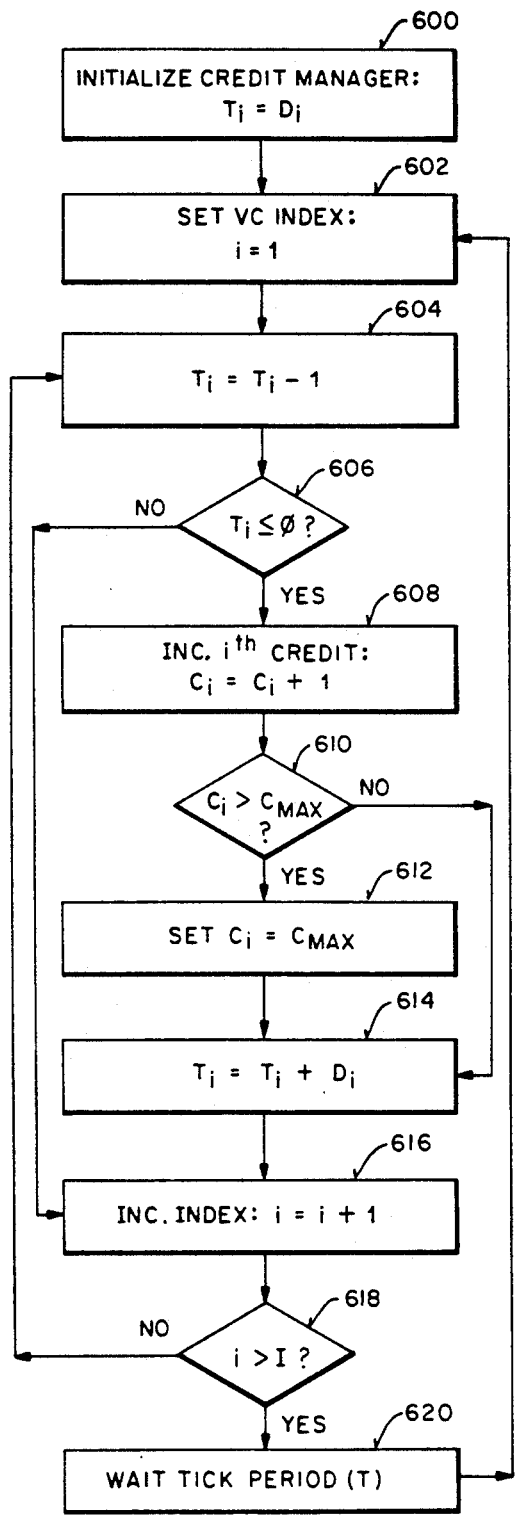
FIG_17
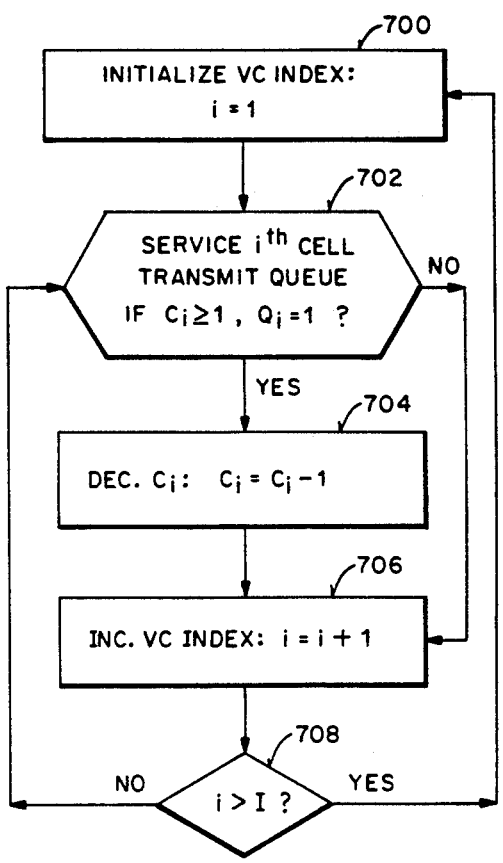
FIG_18

CONGESTION CONTROL FOR CELL NETWORKS

FIELD OF INVENTION

The present invention relates to the field of cell switching network communications. More specifically, the present invention relates to apparatus and method of traffic congestion prevention and control within the cell switching network.

BACKGROUND OF THE INVENTION

The desire to integrate data, voice, image, and video over high speed digital trunks has led to the development of a packet switching technique called cell relay or asynchronous transfer mode.

A typical fully-integrated voice and data network using digital trunk lines (e.g., T1, FT1, E1, T3, etc.) includes a number of geographically distant interconnect nodes. Each node acts as a cell exchanger for receiving and forwarding cell information to its destination. By the use of a variety of interface cards, each node is capable of interfacing to user generated voice and data streams, then segmenting and assembling the streams into a more efficient cell format for transmission over a closed network using digital lines. Each node is also capable of receiving data from other network nodes and forwarding that data through to other network nodes to its ultimate destination. All terminal nodes also provide the necessary interface cards required to reassemble the data contained in the cells into a standard user data stream format.

A typical modern node is capable of handling six classes of cell traffic, each class having different characteristics and different service requirements. The six classes of traffic include:

(1) High priority ("HP") for node-to-node control messages;

(2) Voice for pulse code or adaptive pulse code voice signals;

(3) Low speed statistical ("LSS") traffic sent at rates of less than 64 Kbps which includes statistical and deterministic full-period traffic;

(4) High speed deterministic ("HSD") traffic for full period voice or data at data rates exceeding 64 Kbps;

(5) Bursty data for point-to-point traffic generated by such sources as local area networks, bridges, routers or high speed packet switches within the cell network; and (6) Multicast traffic which is of the same type as bursty data except that it is simultaneously broadcast from one source to many destinations (vs. point-to-point).

Each of these six traffic types are buffered at each network node in accordance with their particular sensitivities to network delay and cell loss. Cell loss may occur due to intermittent short term overload of network bandwidth and lack of adequate buffer capacity. For example, voice traffic is relatively delay sensitive and insensitive to occasional cell loss. In contrast, data traffic, such as file transfers, is relatively insensitive to delay but is data loss sensitive. High priority data is both delay and loss sensitive. To accommodate these differences, each class of traffic is typically placed in a preassigned queue, each with a different service priority. During periods of network traffic congestion, when network traffic demand exceeds the network's bandwidth capacity, servicing algorithms are typically employed to discriminate between traffic classes in order to allocate bandwidth. Delay is managed by properly sizing the queue depths and prioritizing transmission within a class based upon a measure of the time that a cell has been in the network as, for example, by use of time stamps and hop counts.

Even with these sophisticated queueing and service algorithms, congestion (due to excess arriving traffic) can occur. This congestion is typically divided into three categories: short-term, medium-term, and long-term. Short-term congestion, typically handled by discarding traffic at the queue, may be done haphazardly or preferably selectively by having cells marked with their "discard eligibility". Long-term congestion is controlled by admission policies that allocate resources (bandwidth and buffers) at the time a connection is established. If no resources are available, the connection is not allowed.

Medium-term congestion control has been an active topic of research during the last couple of years. Two types of techniques that have been researched are (1) open-loop control techniques involving no explicit feedback from the network in which congestion is controlled by smoothing the flow of input traffic and (2) closed-loop techniques that sense the level of congestion on the virtual circuit and control the in-flow of traffic based on feedback of congesting status information to the source terminal.

An example of a general rate regulation scheme for a bursty data source on a per virtual connection basis is described in a paper by K. Bala, et al., entitled, *Congestion Control for High Speed Packet Switched Networks*, published in the proceedings of the IEEE INFOCOM Jun. 5–7, 1990, pages 520–526. At the initial establishment of a virtual connection, a minimum amount of guaranteed bandwidth is allocated. The simplest system described uses the concept of a "leaky bucket" input rate controller that uses "tokens" and "spacers" to control the average data rate introduced into the packet switched network. Tokens arrive at the controller at a fixed rate. Each token corresponds to fixed number of bytes. The controller buffers the packet until enough tokens are collected for transmitting the entire packet. The token bucket has a fixed maximum capacity corresponding to the maximum packet burst duration. Tokens arriving to a full bucket are dropped. Thus, the system can handle different length packets which are transmitted without fragmentation. Peak rate control is accomplished by means of a spacer that introduces a suitable delay proportional to the length of the prior transmitted packet.

A given session on a virtual connection may last for long periods of time (up to hours). Bursty data sources are characterized by intermittent high data rate burst with significant spans of inactivity between bursts. Under these circumstances, the above described simplest system would result in underutilization of the bandwidth capacity of the system because of the prescribed safe bandwidth limit assigned to the virtual connection session.

Average bandwidth utilization efficiency is typically improved by introducing "colored" tokens, for example, green and red. Green tokens correspond to packets received for transmission that fall within the minimum guaranteed bandwidth protocol while the red tokens correspond to packet data received for transmission in excess of the guaranteed minimum rate. Intermediate nodes provide per trunk FIFO buffer service and use the colors associated with each packet for congestion control. In general, green packets are protected and passed along while red packets are discarded upon arrival whenever the chosen metric (usually queue lengths) for congestion threshold is exceeded. Even though discarding of packets implies retransmission of the lost packet data, the system is represented as improving the average utilization of bandwidth capacity.

An example of prior art feedback control is a window control method, described by K. K. Ramakrishnan and Raj Jain in an article entitled *A Binary Feedback Scheme for Congestion Avoidance in Computer Networks*, ACM Transactions on Computer Systems, Vol. 8, pages 158-181, May 1990. The window control method indirectly controls the effective network data rate by having the user adjust the window duration controlling the number of contiguous packets that can be transmitted at a given time.

For ISO Transport network architectures, each network layer packet has a header that is used for "housekeeping" functions, including routing. Within that header, a bit is assigned as a congestion indication bit. The packet source clears the congestion indication bit when a packet is originally transmitted from a source node end system. Each network router is equipped with congestion detection means that monitors the average queue length at the router at the time the packet arrives.

The average queue length is determined by the number of packets that are queued and in service, averaged over an interval. This interval corresponds to the duration of the sum of the last busy plus idle cycle duration plus the busy interval of the current cycle. When certain average queue length threshold conditions are met at any router, the congestion indication bit is set and forwarded with its associated packet. Once set, the congestion bit remains set even though it subsequently passes through routers with queue lengths not exceeding threshold.

At the destination end system (user transport entity) an acknowledgement message is generated if no error is detected and is sent together with the congestion indication bit status associated with the acknowledged packet. The user transport entity updates the window size based on the number of packet congestion bits set during the last transmission window used. If at least 50% of the bits are set, the window size is reduced from its current value. Otherwise, it is increased. In order to avoid instability in this feedback control system, updating of the user's transparent entity window size occurs only after a time period corresponding to the duration of the last two windows. This delay allows enough time to see the effects of the last window change. In order to promote "fairness" of access by all network users and to achieve stable operation, the window size adjustment algorithm provides for increasing window size by linear increments and for decreasing window size by a multiplicative factor.

In summary, Ramakrishnan and Jain describe a system using window control at the ISO Transport layer using window duration control rather than rate control. Rate control is indirectly controlled by the limiting actions of acknowledgements and window length. Because transmission rate is a direct measure of bandwidth, better short term control of this system resource can be obtained by direct rate control.

C. A. Cooper and K. I. Park in an article entitled *Toward a Broadband Congestion Control Strategy*, IEEE Network Magazine, May 1990, p. 18-23, discuss a congestion control system for variable bit rate traffic using an ATM based fixed length cell switching network which may have elements of both open-loop and closed-loop control. The authors describe a system carrying different classes of service in which a cell rate is assigned to variable bit rate data that is less than the available peak cell rate so as to provide capacity for statistical multiplexing of data. A new connection is admitted only if sufficient network resources are available to support that connection. Cells offered to the network in excess of the assigned rate are immediately discarded because, in the opinion of the authors, the tagging of floating cells for possible subsequent discard appears to yield no substantial advantage. Traffic enforcement is applied on the ingress direction of each virtual circuit. A leaky bucket or credit manager algorithm is used to control the rate.

The Cooper article refers to a reactive (feedback) control method that combines cell tagging with explicit congestion notification ("ECN"). When an asynchronous transfer mode ("ATM") switch detects congestion on a given route, it sends an ECN message over the variable rate virtual circuits on that route to the serving ATM switches which may, in turn, relay these ECN messages to the involved customer premises node. The serving ATM switches operate at one of two preset thresholds for rate enforcement on each variable bit rate virtual circuit using ECN. The lower threshold is used during congestion. Additionally, the ECN message may be transported between network nodes possibly using a separate virtual circuit, and possibly using a bit in the ATM cell header.

SUMMARY AND OBJECTS OF THE INVENTION

One object of the present invention is to optimize the use of available system bandwidth.

Another object of the present invention is the optimization of network resource allocation to bursty traffic when sharing a network digital trunk with the five other traffic classes.

Another object of the present invention is to provide a dynamic bandwidth (or data rate) allocation scheme that allows individual users to use unused network capacity for increasing throughput when necessary to accommodate the peak loads of individual users.

Another object is to provide a method used for allocation that also helps to ensure "fairness" in network resource availability to all users by using linear incremental increases and multiplicative decreases in data rates together with guaranteed minimum rate allocations.

Another object is to provide a cell switching network operating at the International Standards Organization ("ISO") Data Link Layer that direct rate control based on virtual circuit connection congestion.

A further object of the invention is to provide for the fast recovery from congestion.

Another object is to provide congestion relief by tagging cells at the source node when the virtual circuit's guaranteed minimum information rate ("MIR") is exceeded so that if a prescribed cell loss priority ("CLP") of queue depth threshold is exceeded at any intermediate node, tagged cells using that connection may be dropped.

Another object is to provide an adaptive interval between sending rate updates based on the actual measured round trip of the connection.

Another object is to provide each node with means for measuring virtual connection round trip transmission time for use in adaptive interval control.

Another object is to provide means for generating supervisory cells for transmission of congestion control information from destination node to source node in the absence of normal two-way traffic.

Another object is to provide a quiescent information sending rate ("QIR") greater than the guaranteed minimum information rate ("MIR") and less than the peak information rate ("PIR").

Another object is to provide a no rate change feedback indicator in the feedback cell header sent from destination to source node while waiting for the effects of the previous adjustments to occur or while measuring the effects of previous rate adjustments.

A method and apparatus for congestion prevention control, on a per virtual circuit connection basis, in a cell switching communication network handling bursty traffic is described. The control system comprises a source node, optional intermediate nodes, and a destination node. The source node is capable of accepting, queueing and buffering user bursty data, formatting the bursty data into cells, and transmitting the cells to a destination node by a virtual circuit connection through a cell switching network to a destination node. The rate of transmission is incrementally controlled by the state of congestion on the virtual network as reported by the destination node to the source node using the existing two-way virtual connection. Intermediate nodes accept, queue, buffer and forward the bursty cells toward the destination together with an associated incipient congestion indicator. Incipient congestion is measured by monitoring of the virtual connection queue and buffer lengths. The destination node receives the data cells together with the congestion indicator, reconstructs and formats the data for delivery to the end user, and counts the received congestion indicators over an adaptive interval. A feedback rate control signal is generated from the congestion indicator count.

Other objects, features, and advantages of the present invention will be apparent from the accompanying drawings and detailed description that follows.

BRIEF DESCRIPTION OF THE DRAWINGS

The present invention is illustrated by way of example, and not limitation, in the accompanying figures in which like references indicate similar elements and in which:

FIG. 1 is a block diagram of a telecommunication network for voice and data;

FIG. 2 is a cell format diagram;

FIG. 3 is a functional block diagram of a telecommunication node;

FIG. 4 is a data flow diagram;

FIG. 5 illustrates an example of congestion in a cell network;

FIG. 6 illustrates the effects on throughput and delay due to congestion;

FIG. 7 illustrates a cell switching network internal congestion avoidance ("ICA") scheme;

FIG. 8 is a functional block diagram of a frame relay pad ("FRP");

FIG. 9 is a functional block diagram of the transmit portion of a transmitter/receiver ("TXR");

FIG. 10 shows cell loss priority ("CLP") two level thresholding in a TXR;

FIG. 12 is a block diagram of the T1 transmitter/receiver;

FIG. 13 is a diagram of a bursty data queue;

FIGS. 14(a) and 14(b) comprise a flow diagram of a cell traffic servicing routine;

FIG. 15 shows the c-bit count interval timing using the regeneration cycle algorithm;

FIG. 16 is a flow diagram of the data rate control algorithm;

FIG. 17 is a flow diagram of the ICA credit manager function; and

FIG. 18 is a flow diagram for the servicing of the muxbus cell transmit queue by the cell transmitter.

DETAILED DESCRIPTION

Figure 11:
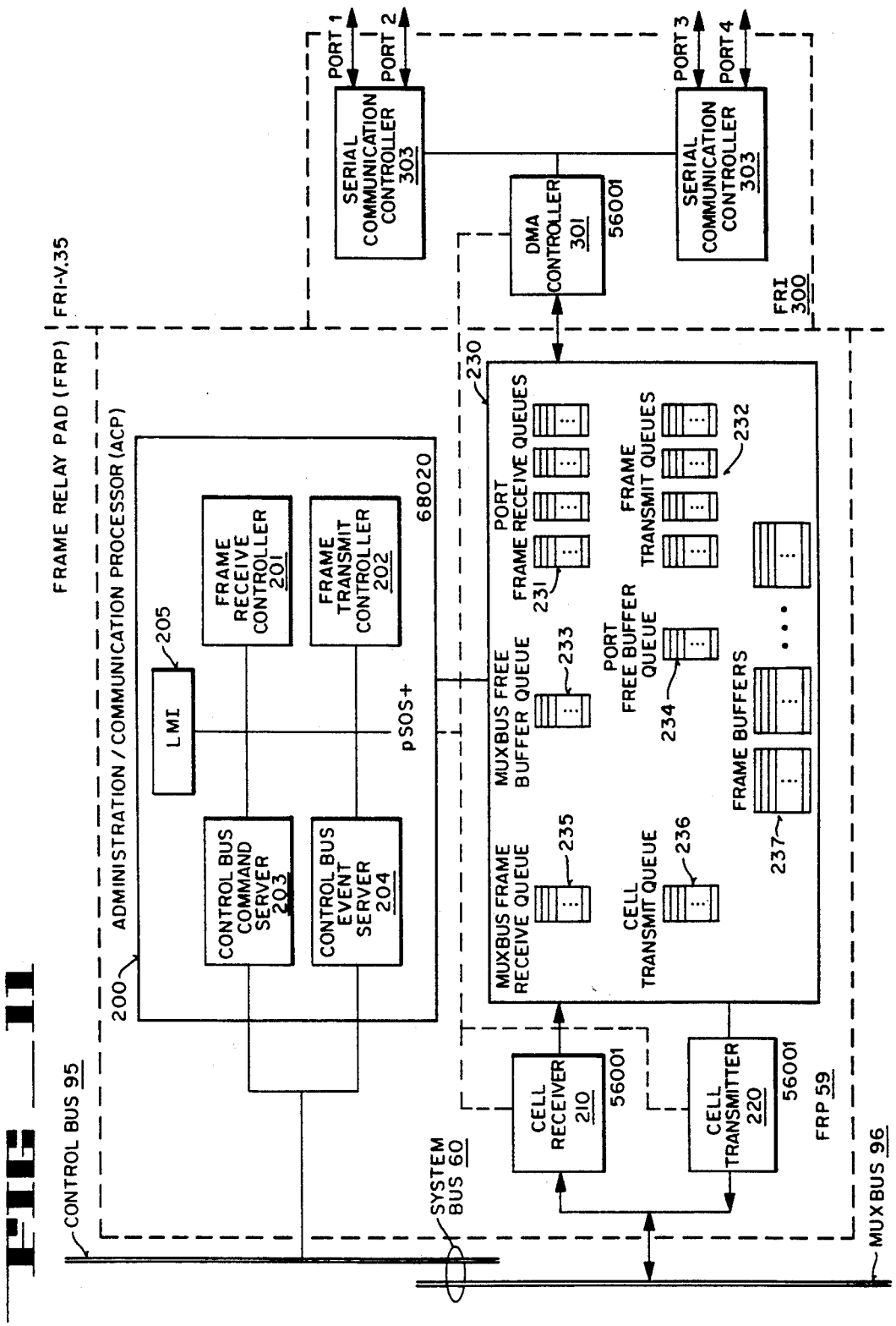
FIG. 11 shows the architecture of a FRP and a frame relay interface (FRI)

FIG. 1 illustrates a fully-integrated voice and data T1 telecommunication network 20 using telecommunication nodes 22, also referred to as integrated cell exchangers 22. The network 20 shown is a domestic network. Those skilled in the art will appreciate that the illustrated network 20 can be modified in known ways to accommodate international traffic by the addition of various interfaces to user equipment and T1-to-E1 interfaces to each node 22.

Each node 22 incorporates a T1 transmitter/receiver that includes the fair queuing and servicing circuitry. The T1 transmitter/receivers support six classes of cell traffic: high priority (HP), voice, low speed statistical (LSS), high speed deterministic (HSD), bursty, and multicast. As will be discussed in detail below, each T1 transmitter/receiver supports the traffic classes via six queues and a service routine. The service routine guarantees a minimum amount of bandwidth to each class of traffic under normal operation and allocates spare bandwidth according to a predefined priority scheme.

Network 20 of FIG. 1 includes nodes 22 in Atlanta, Boston, Chicago, Dallas, and Seattle. Each node 22 is connected to local communication equipment. For example, in Atlanta, a private branch exchange (PBX) telephone system 24, a fax machine 26, a computer 28, video equipment 30, local area networks (LANs) 32, high speed statistical equipment 34, a control terminal 36 and a printer 38 are all connected to the integrated cell exchanger 22. All communication equipment associated with a node 22 is connected through circuit T1 trunks 40.

Each telecommunication node 22 takes existing voice and data streams from its associated communication equipment, assembles the streams into a more efficient cell format, and transmits the cells between nodes via cell T1 lines 42 (shown by broken lines). Similarly, each telecommunication node 22 receives cells from the cell T1 lines 42, disassembles the cells into data streams, and transmits those streams to the appropriate communication equipment via circuit T1 lines 40. Thus, each integrated node 22 can function both as a source and a destination of information.

The term "T1" refers to a telephone line operating at a synchronous data rate of 1.544 million bits per second. T1 lines are digital, and voice signals are digitized prior to their transmission over T1 lines. Under the DS-0 signaling standard, T1 line capacity is segmented into 24 individual channels each operating at 64 thousand bits per second to support voice transmission.

Each node 22 increases the apparent capacity of cell T1 lines 42 using virtual connections. In other words, rather than committing specific resources to a given source-destination pair, each node 22 connects a source-destination pair only when information, in the form of a cell, is present. When cells are not being created for a given source-destination pair, the same network resources are used to transmit cells for other source-destination pairs.

Information is transmitted between nodes over the T1 lines 42 in the form of cells. Cells are packets of fixed length and are typically used in systems that switch a number of traffic classes, as opposed to a single traffic class as in packet switching. The short message length of cells as compared to packets permits cell switching networks to achieve very high rates of network utilization and still maintain short transmission delays. Despite the distinction between cells and packets, the terms are used interchangeably herein.

A general cell format is illustrated in FIG. 2. The cell includes 24 octets, or 8-bit bytes, of information. The first two bytes, octet 0 and octet 1, represent the cell's virtual circuit identifier. The virtual circuit identifier allows the cell to be self-routing through network 22. Octet 2, the third byte, indicates the type of data contained within the cell namely, voice, video, etc. Octet 2 also includes a cyclic redundancy check ("CRC") code, which is used by node 22 to perform an error check on the first four octets of the header. Octet 3, the fourth byte of the cell, may contain a time stamp, congestion control bits, or hopcount depending upon the traffic class. The remaining octets of the cell are generally devoted to information or payload.

Using the traffic type bits in octet 2, nodes 22 support six types of cell traffic. Identification of different traffic classes allows T1 transmitter/receivers to discriminate among classes of cell traffic for queuing and servicing purposes. The classes of cell traffic supported by nodes 22 are high priority traffic, voice traffic, low speed statistical traffic, high-speed deterministic traffic, bursty traffic, and multicast traffic.

High priority cells are indicated by a binary 100 in octet 2. High priority traffic includes inter-node cell exchanger-to-cell exchanger messages. This class of traffic is given the highest servicing priority so that network failures and overloads can be quickly remedied.

Voice traffic is represented by a binary 010 in octet 2. Voice traffic includes pulse coded modulated ("PCM") and adaptive differential pulse coded modulated ("ADPCM") voice signals. Such traffic is relatively intolerant of servicing delays but, given its redundant statistical nature, can withstand some intermittent loss of cells without a noticeable adverse effect.

Low-speed statistical traffic includes cells generated by equipment operating at less than 64 thousand bits per second. Low speed statistical traffic can tolerate some delay between generation and transmission, but cannot tolerate any loss of data from a message. This class of traffic is represented by a binary 111 in octet 2.

Low speed statistical cells carry a timestamp in octet 3. Using timestamps, nodes 22 can determine how long low-speed statistical cells have been in network 20 and transmit the oldest cells first. Timestamps are also used to discard cells exceeding a maximum age, which is software-setable.

High speed statistical cells encompass high-speed, full-period voice or data signals. This class of traffic tolerates very little service delay and is equally intolerant of loss of data from a message. A binary 110 in octet 2 indicates a cell of high speed statistical.

The bursty and multicast classes of cell traffic supported by nodes 22 are quite different from the four other traffic types. Bursty and multicast traffic transport high-speed, statistical data from sources such as local area networks (LANs), bridges, routers, brouters and high-speed cell switches. Both types of traffic are characterized by burstiness. As used herein, the term "bursty data" refers to bursty point-to-point traffic between nodes 22. Multicast traffic carries bursty traffic from any one to all other nodes 22 in network 20. Both bursty traffic and multicast traffic are relatively delay insensitive. Thus, during periods of congestion, cells of these traffic classes may be buffered rather than discarded. Bursty traffic is represented in octet 2 by a binary 101 and multicast traffic is represented by a binary 011.

Bursty traffic and multicast traffic also differ from other traffic classes in that the octet 3 of each cell contains a hopcount. Hopcounts serve a purpose similar to timestamps, but are more practical than timestamps at high speeds. A cell's hopcount indicates the number of nodes 22 previously traversed by the cell in its journey between source and destination. The higher a cell's hopcount the greater the cell's service priority as compared to other cells within that class of traffic. In one embodiment, the maximum hopcount is 15; however this number is software selectable and may be modified to suit specific network applications.

A block diagram of a node 22, which includes the T1 transmitter/receiver ("TXR") and frame relay pad ("FRP") of the present invention, is shown in FIG. 3. The circuitry within the node 22 performs two basic functions: traffic segmentation and reassembly. While the node 22 is functioning as a source of messages, segmentation involves receiving incoming bit streams from the communication equipment and assembling it into cell formats. Trunk interface units buffer data in queues and route the cells through the network 20. Similarly, when node 22 functions as a destination for messages, the trunking interface receives cells and routes them to the appropriate circuitry for reassembly. Reassembly is the process of converting cells into data streams or packet frames.

Node 22 includes a processor controller 50, a data assembler/disassembler ("PAD") group 52, a voice data assembler/disassembler ("PAD") group 54, TXR 56, circuit/cell T1 interface 58 and FRP 59. A system-wide system bus 60 which includes two buses, transports data and control information throughout node 22. Part of system bus 60, muxbus is a high speed statistical bus for switching cells. Also part of bus 60, control bus configures, manages, and monitors the components 50, 52, 54, 56, 58, and 59 of node 22.

Processor controller 50 manages the various circuits within node 22, with direction from an operator using a control terminal and a printer. Processor controller 50 manages the routing of cells via network configuration databases. Processor controller 50 distributes control and configuration information via the control bus to the 50, 52, 54, 56, 58, and 59 each of which is coupled to the control bus by an 80C31 controller. Additionally, network processor controllers 50 in Atlanta, Boston, Chicago, etc., cooperate to perform network-wide functions.

Processor controller 50 uses a 16-bit 68000 microprocessor supplied by Motorola Corporation of Schaumberg, Ill., as its basic processing unit. The 68000 microprocessor contains the software for controlling, diagnosing, and monitoring integrated cell exchanger 22. This software is stored in 2 Megabytes of flash EPROM and 8 Mbytes of DRAM. The preferred embodiment of processor controller 50 also utilizes a bus controller sold by Intel Corporation of Santa Clara, Calif. to manage the control bus.

A portion of the node's 22 segmentation and reassembly function is performed by voice/data processor 62. Voice/data processor 62 assembles and disassembles cells of voice and data samples for cell T1 lines 42 using the DS-0 standard. This includes voice-band data generated by modems and FAX machines. Voice/data processor 62 is bidirectional.

Each voice connection within network 20 requires two voice/data processors 62, one at each end of the connection. Utilizing voice activity detection the source voice/data processor 62 determines when to generate cells. Voice activity detection provides a 2:1 compression of PCM voice. The source voice/data processor 62 extracts voice from a T1 port, packetizes it, and sends the packets to the remote voice/data processor 62. The remote voice/data processor 62 reassembles the voice signal from the cell stream and passes it on to the appropriate external device, for example, PBX 24.

Voice compressor/decompressor 64 receives voice samples from voice/data processor 62. The voice samples are converted from PCM to compressed adaptive differential pulse code modulation (ADPCM) when the node 22 is acting as a source. Voice compressor/decompressor 64 converts ADPCM back to PCM when node 22 acts as a destination.

Synchronous data interface 66, synchronous data cell assembler/disassembler 68, and low-speed data cell assembler/disassembler 70 perform another portion of the segmentation and reassembly function within node 22. Both cell assembler/disassemblers 68 and 70, commonly referred to as packet assemblers/dissemblers ("PADs") buffer, assemble and format data cells. The cells are transmitted to and received from system bus. Synchronous data PAD 68 provides four different physical interfaces: RS232C/D (V.24), V.35, RS422/449, and X.21/V.11. Low speed data PAD 70 supports low speed data applications. Both low speed data PAD 70 and synchronous data PAD 68 can be configured for transparent, bit-for-bit transmission or for data compression using repetitive pattern suppression.

Frame relay PAD (FRP) 59 performs segmentation and reassembly of high-speed bursty data and multicast data. Frame relay PAD 59 is typically connected to LAN devices, such as routers and bridges. In the present invention, FRP 59 provides network cell rate control functions in cooperation with TXR 56.

Queuing and transmission functions for node 22 are provided by T1 TXR 56 and circuit/cell interface 58 of FIG. 3. TXR 56 contains routing tables for the cells to be transmitted on cell T1 lines 40 and buffers, or queues, for those cells. Each of the six traffic types supported by node 22 is queued separately, as will be discussed in detail below. TXR 56 performs the T1 line framing and signal control, cell servicing, and alarm detection and generation. Circuit/cell interface 58 provides interface support for bidirectional T1 lines 40 and 42. The conversion of bipolar signals from cell T1 lines 42 into logic-levels for use internal to node 22 is also performed by circuit/cell interface 58.

Data is transmitted across T1 network 20 over a virtual circuit between a pair of data PADs, 68, 70, or 59. The flow of data into and out of node 22 is illustrated in FIG. 4. A data stream from local communication equipment is received either by synchronous data PAD 68, low speed data PAD 70, or frame relay PAD 59. The source data PAD 68, 70, or 59 builds data cells at a rate proportional to the baud rate of the data. The PAD 68, 70, or 59 passes the cells to system bus 60 for delivery to TXR 56. Transmitter/receiver 56 places the cells in the appropriate queue according to traffic type where the cells await delivery to cell/circuit interface 58. The cells are transmitted onto cell T1 lines 42 by cell/circuit interface 58. Cell traffic coming into node 22 follows the reverse path.

FIG. 5 is an example of a four node network 20 for use in explaining the onset of congestion interval to network 20. Assume that a bursty data working connection between user A at node 22-A and user C1 at 22-C via node 22-B involving FRP 59A1, TXR 56A1, TXR 56B1, TXR 56B2, TXR 56C1, and FRP 59C1. Further, assume that user D subsequently establishes a working bursty data connection through node B to user C2 at node 22-C involving FRP 59D1, TXR 56D1, TXR 56B3, TXR 56B2, TXR 56C1, and FRP 59C2. If either user A or D should increase their transmission rate because of an excess available input load, node 22-B could become congested at the common TXR 56B2 (shown shaded) if the combined bursty data rate exceeds the available capacity on trunk 42 connecting nodes 22-B and 22-C. Similarly, congestion could occur in the reverse direction at TXR 56B3 of node 22-B interfacing with cell trunk 42 connecting node 22-B and 22-D if the combined bursty traffic between user C2 and node 22-D plus that between, say, user B and node D exceeded the available bandwidth between nodes 22-B and 22-D.

FIG. 6 shows the effects of congestion on effective network bandwidth and delay as a function of the offered load bandwidth. At low average load rates (Region I), throughput increases linearly with load, while delay shows a moderate rate of increase with load. When throughput approaches the network's information rate capacity, mild congestion results (Region II) as average queue lengths increase. Throughput saturates, increasing only slightly with increased offered load, while delay exhibits sharp increases. Finally, if the offered load increases some more, threshold is exceeded when Region III is reached, causing a breakdown in throughput (severe congestion) and hence unlimited delay because of data losses requiring constant retransmission.

In order to efficiently use the bandwidth resource of a cell switching network, it is desirable that peak offered loads be accommodated by adequate buffering, particularly for bursty data which is more tolerant of network delay. Bursty data tends to be high-bandwidth short-duration messages that, if uncontrolled, may either cause congestion or require that the network operate with a high percentage of average unused bandwidth. Ideally, the average offered load would operate at point A of FIG. 6, where peak loads would not be likely to cause severe congestion.

The method and apparatus for congestion prevention control described below is applied to cell switching networks of the type described. These cell networks are designed to interface with user data ports operating at the CCITT asynchronous transfer mode ("ATM") adaptation layer of ISDN networks. The cell network accepts frame relay data at its input nodes and produces frame relay data at its output nodes. The entire operation of the cell switching network is intended to be completely transparent to the frame relay user. For this reason, the congestion control system is hereafter referred to as an internal congestion avoidance ("ICA") method and apparatus, wherein "internal" means internal to the cell switching network.

FIG. 7 is an abstract representation of an internal congestion avoidance feedback control system. The purpose of the ICA feedback control system is to anticipate the onset of congestion in the bursty data queues of the network nodes and correct the cause of the incipient congestion in a timely fashion. Corrective action is taken, on a per channel basis, by controlling the rate at which each bursty source node contributing to the congestion, accepts incoming user data.

In FIG. 7, assume that node 22-A is the source node, node 22-B is an intermediate node and node 22-C is the destination node. FRP 59 of node 22-A accepts user data from one of the input virtual data ports. It is assumed that the input data contains bursty framed data. FRP 59 disassembles the data frames into cells and regulates the rate at which they are delivered to TXR 56 for transmission over virtual connection 182 to intermediate node 22-B. Other TXR 56 units (not shown) at node 22-B may each receive bursty data cells, each receiving TXR 56 directing the bursty data cells over the system bus 60 to the appropriate bursty data queue in a TXR 56 for transmission over one or more common trunks.

Each of the output TXR 56 units of nodes 22-A and 22-B performs traffic control and an ICA detection function by monitoring the length of its bursty data queue. If the queue length exceeds a prescribed threshold length, a congestion indicator bit (c-bit) is set in the header (octet 3, bit 5) of all bursty data cells transmitted from node B to node C while threshold is exceeded. This same TXR 56 unit also performs a traffic control function including the discarding of cells when congestion conditions require.

At the input to node 22-C a TXR 56 performs the receive functions previously described and directs the cell traffic to the appropriate queue of an output FRP 59 unit via system bus 60 where the cells are assembled into frames for delivery to the user C virtual port 40. In addition, FRP 59 examines the headers of each bursty data virtual circuit and generates an estimate of the congestion status by comparing the average c-bit rate with a threshold reference value. If threshold is exceeded, indicating incipient congestion, an ICA rate control message is fed back to the source FRP 59 unit in source node 22-A, where user A's input rate is decreased so as to relieve the congestion present on its virtual circuit.

The FRP 59 unit of the source node 22-A also provides an additional traffic control feature by marking burst data cells that are delivered by user A at an excess rate. A cell loss priority ("CLP") indicator bit is set in the cell header (octet 3, bit 4) and, like the c-bit, once set remains set throughout its journey to the destination FRP 59. This CLP bit is used by the intermediate transmit TXR 56 of node 22-B for prioritizing cells for discard when required by congestion conditions. Cells marked by asserted CLP bits are discarded first. Of course, the discard of any one cell in a given data frame requires the retransmission of the entire frame of data. A two threshold algorithm is used in order to discard cells that, with high probability, belong to the same frame.

Although this overview of the ICA control system was explained in the context of a data transmission virtual link between source and destination, it should be noted that the virtual connections are usually two-way connections sharing common resources. Hence, for one embodiment both source and destination nodes have symmetrically interchangeable roles. As will be seen in the following discussion, each FRP 59 and TXR 56 has a distinct receiver function coupling node input data to system bus 60 and a distinct transmit function coupling data from system bus 60 to the node output.

The ICA rate control feedback path 180 is the return path of the existing virtual connection. Intermediate node B is not necessary for implementing a virtual connection or for operation of the ICA system. Instead, the intermediate node B should be interpreted representing a possible multiplicity of concatenated intermediate nodes performing similar functions.

FIG. 8 is a more detailed functional description of an FRP 59 unit. Input user data arriving on user input 40 is accepted by traffic monitor 801 that compares data with the guaranteed minimum information rate ("MIR"), the committed burst duration (Bc) and the quiescent information rate ("QIR") time-out parameter, $T_Q$. If MIR, for a given connection, is exceeded, a CLP bit is set in each cell of each frame exceeding the MIR. Frames are sorted into distinct virtual connection ("VC") queues 803, one per connection. Segmenter 805 operates on the data in VC queues 803, in an order prescribed by the serving protocol, and segments the VC frames into VC cells, which are sent to system bus 60 of node 22 by cell transmitter 807. Additionally, segmenter 805 sets a bit in the final cell of a frame if that frame was received with its DE bit set (indicating excess frame rate at the frame relay layer). The rate of transmitting cells for each virtual connection by cell transmitter 807 is controlled by credit manager 809 operating cooperatively with rate controller 811 to provide incrementally variable transmission rates. $C_{max}$ is a configurable parameter for credit manager 809 that specifies the maximum number of cell transmission credits that may be accumulated by a given virtual connection, when the virtual connection is idle.

Rate controller 811 initially sets each VC cell rate to a value equal to the configuration parameter QIR, representing the quiescent information rate. QIR is bounded on the lower side by the guaranteed minimum information rate (MIR) and on the upper by the peak information rate parameter ("PIR"). The rate setting is subsequently dynamically adjusted by rate commands received from the VC destination FRP 59 via cell receiver 815. For one preferred embodiment, a two-bit coded message embedded in the cell header (octet 3, bits 2 and 3) of return traffic is used to encode a four-state rate message: increase, decrease, large decrease, and no-change. In response to the rate control message, controller 811 increases the rate by linear additive increments (typically 1/10 of MIR) and incrementally decreases the rate by a multiplicative factor of $\frac{2}{3}$ or $\frac{1}{2}$, the latter being used when cell loss in conjunction with congestion is detected by the destination FRP 59. Controller 811 also monitors the VC queue depth to see if sufficient data is present to warrant a data rate increase.

No increase is made if sufficient data is not present. Traffic monitor 801 also provides controller 811 with a reset signal that causes the rate to be reset to QIR when no data has been presented to traffic monitor 801 for a period equal to configuration parameter, $T_Q$.

Credit manager 809 performs the function of controlling the intervals at which each virtual connection is permitted by cell transmitter 807 to transmit a cell to system bus 60.

The receive portion of FRP 59 comprises cell receiver 815, reassembler 817, DE filter 821, port transmit queues 819 and traffic analyzer 813. Receiver 815 interfaces with the local system bus 60 from which it receives its virtual circuit data from the connection's other terminal node. The congestion indicators (c-bits) and loss data information is provided to traffic analyzer 813. Cell data is passed on to reassembler 817 that reconstructs frames from cells and sets the DE bit if the last cell of the frame indicates that the DE bit was set in the frame header when received from the sending user. DE filter 821 monitors the port transmit queue depths and compares them against a threshold, DEth, typically set at approximately 75% of total queue depth. If threshold is exceeded, frames with the DE bit asserted are discarded first.

Traffic analyzer 813 analyzes the average c-bit rate over the measured round trip delay ("RTD") provided by PCC 50 of the local node 22 of FIG. 3. If the average count of c-bits exceeds a prescribed threshold, TAth, (typically ½ of total possible count), a moderate rate decrease message is generated and supplied to cell transmitter 807 where it is embedded in a cell header and transmitted to the other terminal FRP 59. If cell loss is also present, a large rate decrease message is sent. If threshold is not exceeded a rate increase message is generated. A no-change rate message is sent with all outgoing cells for an interval of two times RTD, so that the effects of the previous rate change message may be observed before introducing additional changes. This delay in adjustments is necessary for stable congestion control.

Traffic analyzer 813 also monitors port transmit queues 819. If the output port transmit queue used by a particular VC shows incipient congestion, any rate increase message generated by traffic analyzer 813, based on the VC average c-bit count not exceeding the TAth threshold, is changed to a rate decrease message even though the c-bit count threshold, TAth, is not exceeded. In one embodiment, output port incipient congestion is determined by comparing the average queue depth of port transmit queues 819 against a configurable threshold, PQth. The PQth threshold is normally set at four kilobytes, a fraction of the 64 kilobyte queue capacity. Average queue depth is calculated by traffic analyzer 813 using a regeneration cycle averaging period.

A regeneration cycle is defined as a busy plus idle interval of burst data. This average may be used for the entire duration of the next cycle. Alternatively, when the regeneration cycle is very long, the averaging may include the previous regeneration cycle count as well as the current count, averaged over the previous regeneration cycle time plus the current portion of the subsequent regeneration period.

In addition, test generator 861, echo unit 863 and RTD measure unit 865 comprise the means for measuring the RTD of a virtual connection. Periodically, PCC 50 of local node 22 initiates an RTD measurement test by instructing test generator 861, via system bus 60, to generate a high priority RTD cell for transmission by cell transmitter 807. When the RTD cell is received at the other terminal node by its FRP 59 cell receiver 815, it is directed to RTD echo unit 863 and retransmitted as a high priority RTD cell via its associated cell transmitter 807. Upon receipt of this echoed RTD cell, the initiating node 22 cell receiver directs the cell to RTD measure unit 865 that measures the elapsed time between the time of original RTD cell transmission and the receipt of its echo. RTD measure unit 865 provides this data to PCC 50 via system bus 60 which in turn supplies this information as an RTD configuration parameter to traffic analyzer 813.

FIG. 9 shows a more detailed functional block diagram of the transmit portion of TXR 56. This part of TXR 56 provides the traffic control and congestion detection in the preferred embodiment. On one side, TXR 56 interfaces with system bus 60 of its local node 22 from which it receives cells destined to be transmitted over a common trunk 42.

Bursty cells arriving at the input of TXR 56 are sorted into queues 135 according to traffic class. Bursty data cells are queued in BD queue 855 where the average depth is monitored for indications of incipient congestion by congestion detector 857 by comparing the average queue depth with configurable threshold parameter, ECNth. If threshold is exceeded, the next bursty cell processed by cell server 853 will have a c-bit set in its header.

Threshold ECNth is selected so as to introduce a tolerable amount of delay due to queue length while minimizing the amount of cells discarded. A value of 30 cells has been found acceptable.

The average BD queue 855 queue depth is also based on a regeneration cycle averaging period. Also, the BD queue 855 depth is used to control the discard of cells by CLP filter 851 which discards arriving bursty cells with the CLP bit set if threshold CLPth1 is exceeded. Discarding of CLP labelled cells continues as long as a second threshold, CLPth2, is exceeded (CLPth2 ≧ CLPth1). In this manner, hysteresis is provided in the control mechanism so that it tends to discard the following cells belonging to the same frame, as shown in FIG. 10. This strategy recognizes that once a cell belonging to a given frame is discarded, the integrity of the entire frame is violated, requiring retransmission of the entire frame. Also, this control method has the added advantage of more probably relieving the congestion, rather than oscillating about a single threshold value. Thresholds CLPth1 and CLPth2 are configurable parameters supplied by PCC 50 of FIG. 3 and typically set a approximately 75% and 25% of queue capacity, respectively.

In order to facilitate the explanation and understanding of the various embodiments, the following is a more detailed description of the FRP 59 and TXR 56 architecture and hardware wherein the invention is implemented.

FIG. 11 shows the architecture of a FRP 59 and of a frame relay interface (FRI) unit 300 used to interface FRP 59 to four V.35 data ports, in one preferred embodiment.

DMA controller 301 of FRI 300 is a dedicated Motorola Corporation 56001 digital signal processor ("DSP") that interfaces between global frame RAM 230 and two-way serial communication controller ("SCC") 303. Four V.35 ports are provided, each capable of operating full duplex at bit rates up to 2.048 Mbits/sec. DMA 301 receives frames from the ports via SCC 303 and stores them in frame buffers 237 of global frame RAM 230. Also, DMA 301 transmits frames from frame buffers 237 to the data ports through SCC 303. In addition to data transfer, DMA 301 handles start and end of frame interrupts, extracts the cyclical redundancy check ("CRC") indicator from SCC 303 and appends it to the frame, and interfaces with frame transmit controller 202 and frame receive controller 201 in ACP 200 through queues in global frame RAM 230. Once the data ports are configured and enabled, DMA 301 takes pointers to frame buffers 237 from port free buffer queue 234 for use in storing incoming frame data. Because all ports may operate simultaneously, DMA 301 maintains a separate control block for each port. When a start or end of frame interrupt occurs during frame reception, DMA 301 notifies frame receive controller 201 through port frame receive queue 231. For frame transmission, DMA 301 polls frame transmit queues 232 (one per port). Separate control blocks are maintained for each port. An entire chained frame may be transmitted or received without ACP 200 intervention for each frame buffer. DMA 301 maintains the following information for each transmitted or received frame: pointer to the start of frame in global frame RAM 230, pointer to the current work location in RAM 230, and current length of the frame.

FRP 59 comprises four major units: administration/communication processor (ACP) 200, multiported global frame RAM 230, cell receiver 210, and cell transmitter 220. Four processors are included on the FRP 59 board: an Intel Corporation 8751 microcomputer acting as a control bus kernel, interfacing FRP 59 to the control bus of system bus 60; a Motorola Corporation 68020 microprocessor that serves an administrative and main communication control (ACP 200) functions; two Motorola Corporation 56001 digital signal processors, one dedicated to cell transmitter 220 and the other to cell receiver 210. FIG. 5 shows two paths between the 68020 microprocessor of ACP 200 and the 56001 microprocessors in receiver 210, transmitter 220, and DMA 301. The solid lines represent the typical flow of data and control information between the microprocessors and global frame RAM 230. Normal frame relay communications is done through these data paths. The dashed lines represent a secondary control path between ACP 200 and the host port of each 56001 microprocessor for handling administrative functions such as diagnostics and statistics collection.

Control bus command server 203 of ACP 200 responds to commands received from processor controller 50 (FIG. 3) over the control bus 95 portion of system bus 60, sending responses to event server 204 for forwarding to processor controller 50 via a FIFO queue to the control bus kernel microcomputer, or for forwarding commands to the communication units, i.e., frame receive controller 201 and frame transmit controller 202. Controllers 201 and 202 perform real-time control functions. Cell transmitter 220 maps frames received from FRI 300 data ports to cell network connections, applies the ICA control scheme, fragments frames into cells, and transmits cells on muxbus 96 toward the destination node. Cell receiver 210 coordinates receipt of frame fragments (cells) from muxbus 96, reassembles cells into frames. Frame transmit controller 202 transmits those frames to the proper user port, linking cell receiver 210 to DMA 301 through RAM 230, where reassembly takes place. Transmit controller 202 maintains muxbus free buffer queue 233 for the use of receiver 210 to determine the next buffer to use to store reassembled frame data. LMI 205 is an optional local management interface for verifying the integrity of the V.35 physical link and for providing status from the cell network to the user device. These ACP functions (receive controller 201, transmit controller 202, command server 203, event server 204 and LMI 205) are tasks executed under the operating system running on the 68020 microprocessor.

Cell receiver 210 and transmitter 220 operate as dedicated controllers. Communications between them and communication controller tasks 201, 202 and DMA 301 is primarily through queues in global frame RAM 230. Using these queues simplifies the timing requirements on the communication control tasks, allowing them to operate less frequently on larger groups of requests.

Queue 236 points to the location of the cell data in frame buffers 237 of RAM 230 together with the number of octets to send, the virtual circuit identifier for the cell, the initial timestamp value to be placed in the cell header, and an indication of whether the cell is a start-, middle-, or end-of-frame fragment. The cell is sent to muxbus 96 via the muxbus transmit FIFO of cell transmitter 220.

Cell transmitter 220 controls the rate of transmission of cells onto muxbus 96 by means of a credit manager (similar to that described for servicing cell traffic by TXR 56). After the start of frame indication, queueing of cells for transmission on muxbus 96 does not occur until one of the following occurs:

(1) the end-of-frame indication is received in frame receive queue 231, so that the exact length of frame is known, or (2) the data received since the start-of-frame indication is sufficient for a full cell's payload data to have been received.

Cell transmit queue 236 is polled successively to see if one of these two conditions (ensuring sufficient data to transmit a cell) prevail. If so, the control is subjected to the ICA credit-manager control scheme to be described later.

FIG. 12 illustrates T1 transmitter/receiver 56 that implements the circuitry and method for queuing and servicing cell traffic. T1 TXR 56 is divided into two sections, a transmitter 72 and a receiver 70.

Receive state control 74 coordinates the operation of T1 receiver 70. Incoming data from another node 22 is received as a T1 bit stream 80 and an extracted clock 82 sent by circuit/cell interface 58. T1 deframer 84 strips the T1 framing pattern from the incoming bit stream and sends the received octets of the cell through descrambler 86 and CRC checker 88. If the CRC for the cell is in error the cell is destroyed. If the CRC is correct, the cell is placed into receive packet FIFO 90.

When muxbus output control 92 is notified by muxbus address and control signals 94 that it may dispatch a cell onto muxbus 96, the first cell stored in receive packet FIFO 90 is driven onto muxbus data bus 98 through output register 100. If there are no cells in receive packet FIFO 90, a cell consisting of "all ones" is written to muxbus data bus 98.

The operation of the T1 transmitter 72 is coordinated by queue manager 76. Queue manager 76 includes a high-speed microprocessor 110, RAM 112 and program ROM 114. The fair queueing and service routines are implemented in software, which runs on microprocessor 110. The fair queuing and servicing routines will be described below, following a general description of the structure and operation of transmitter 72.

The arrival of a cell via muxbus 96 to transmitter 72 is accompanied by a combination of asserted address and control signals 116 to input state control 118. Coincident with these control signals 116, the first two octets of the cell, comprising a virtual circuit identifier, are received into the pipeline registers 120 from muxbus data bus 96.

If the cell is to be queued, then input state control 118 performs a series of functions. First, a new packet start address is fetched from packet start address FIFO 124 which is passed together with the output of counter 126, through mux 128. This forms the address for queue memory 135. As each successive octet of the cell exits pipeline registers 120 onto queue memory bus 140, each byte is written into a location in queue memory 135 pointed to by the packet start address and indexed by counter 126, which increments with each octet.

Simultaneously, a packet information block is created for the cell. Octet 2 and 3 of the packet and the current time, which is used as a queue input time, are written into packet information FIFO 152. This is done through mux 154, and forms the packet information block. Thus, queue manager 76 is notified that a cell has just been queued, where that cell is stored, the traffic type, its timestamp value or hopcount, if applicable, and when the cell arrived.

Current time counter 158 is incremented by the 125 microsecond clock 160 from muxbus 96. Current time counter 158 may be interrogated by queue manager 76.

When queue manager 76 decides to dispatch a cell, it writes the packet start address and updated timestamp or updated hopcount, if applicable, to output state control 144. Output state control 144 fetches each byte of the cell to be dispatched from queue memory 130 by applying the appropriate addresses to queue memory 135 through mux 128. Each octet of the cell is moved via queue memory bus 140 through MUX 146 to CRC generator 142. Queue memory 135 is time-shared between input state control 118 and output state control 144.

In the case of timestamped data cells, an updated timestamp, previously written to output state control 144 by queue manager 76, will replace the fourth octet of the cell. This is achieved by activating mux 146. CRC generator 142 calculates and then writes a CRC-5 code into the lower bit field of the traffic type/CRC octet. The CRC covers the first four octets of the cell.

Similarly, in the case of cells bearing hopcounts, the cell hopcount will be updated prior to dispatch by queue manager 76. Again, the cell CRC will be recalculated by CRC generator 142.

The octets are then sent through scrambler 148 to T1 framer 150, which inserts cells into T1 frames.

Given this general description of the operation of transmitter 72, it will be appreciated that the difference in treatment between the various classes of cell traffic is determined by queue manager 76. Queue manager 76 performs two major functions: queueing cells and servicing cells. During queueing and servicing, queue manager 76 treats the various classes of cell traffic differently.

During queueing, queue manager 76 fetches packet information blocks from packet information FIFO 152. Packet information blocks contain a representation of the cells that have been stored in queue memory 130.

The traffic type field of the packet information block is interrogated to determine into which queue the packet information block should be appended. There are six traffic queues: high priority, voice, low/speed statistical, high speed deterministic, bursty, and multicast.

The queues are linked lists of packet information blocks. FIG. 13 illustrates the queue structure of the bursty and multicast traffic queues, which utilize hopcounts.

The bursty traffic and multicast traffic queues are nearly identical. Thus, while the description that follows refers to the bursty traffic queue, it will be understood that the following description applies equally to the multicast traffic queue. Queuing of bursty traffic differs from the other queuing schemes. The difference arises, in part, because these traffic queues include a number of subqueues as shown, for example, in FIG. 7 and numbered 1 through 15. Each of the subqueues is a FIFO queue including a set of linked-lists. As each cell of bursty traffic is received it is placed into one of the subqueues according to the hopcount stored in octet 3 of the cell. Thus, a cell of bursty traffic with a hopcount of 13 will be placed at the end of subqueue 13 of the bursty data queue. Cells of bursty traffic having hopcounts greater than 15 are simply discarded, as they have used more network resource (delay) than permitted. The maximum hopcount is 3 for the bursty queue for one embodiment due to limited coding bits in octet 3 of the cell header. This maximum could, however, be increased to allow cells of bursty data traffic to use more network resource by increasing the hop-count coding capacity. Because of this coding bit limitation, cells are not discarded when the count exceeds 3 but continue to carry a maximum hop-count of 3.

Cells within the bursty traffic queue are serviced according to subqueue priority order, with subqueue 15 having the highest priority and subqueue 1 having the lowest priority. For the bursty traffic queue a subqueue pointer indicates the highest ranked non-empty subqueue. The indicated subqueue will be serviced first whenever bursty data traffic is serviced. The subqueue pointer is updated whenever cells are placed into the bursty data queue or the queue is serviced.

Servicing the bursty traffic queue includes taking the cell designated by the subqueue pointer and updating both the linked lists and queue depths. Additionally, during the servicing of the bursty data queue the hopcount of the serviced cell is incremented by 1. If the serviced cell was the last cell in the subqueue, the subqueue pointer is updated to indicate the highest priority non-empty subqueue.

The result of the priority scheme used in the bursty traffic queue is that priority is given to cells which have used more network resource (delay). Possible undesirable effects of this priority scheme are freezing of lower priority subqueues during periods of congestion and lengthy queuing delays. These effects are avoided by an aging mechanism. The aging mechanism allows overaged cells to be discarded, while cells that have spent too long in one subqueue are moved to the next subqueue with a higher priority. A cell's queuing priority is effectively increased by moving to another subqueue, but the hopcount is unaffected.

Table 1 is an example that details the mapping of service order, j, and spare bandwidth priorities, k, for each class of traffic, i, in the preferred embodiment. Note that the service priority is according to assigned minimum bandwidth.

TABLE 1

| Traffic Name | Class Number i | Service Order*, j | Spare Bandwidth Priority, k |
|---|---|---|---|
| High Priority | 0 | First | X |
| High Speed Deterministic | 1 | * | 1 |
| Low Speed Statistical | 2 | * | 2 |
| Voice | 3 | * | (3)** |
| Bursty | 4 | * | (4)** |
| Multicast | 5 | * | (5)** |

*Service order determined by minimum configured bandwidth.
**Spare bandwidth priority for classes i = 3, 4, and 5 are equal.

The servicing routine uses a credit accrual scheme to ensure that each class of traffic receives a selectable minimum bandwidth. In selecting minimum bandwidths for each class of traffic, let N denote the total available bandwidth on a cell T1 trunk and let T denote the queue server tick interval. The unit of N is not relevant; it can be specified as a number of cells per second, or any other throughput unit. For a non-fractional T1 trunk N=8000 cells per second. Similarly T can be given in any convenient unit of time. For one embodiment of the node, the tick interval T equals 125 microseconds. Thus, the product N*T represents the capacity of the cell trunk per tick interval, or the quantum of bandwidth.

Each class of traffic is assigned a minimum amount of the quantum of bandwidth, with the exception of high priority traffic. This is because all high priority traffic will be serviced regardless of the required bandwidth. The sum of the minimum class bandwidths must be less than N to allow some bandwidth for high priority traffic. In other words, if i represents the class number, and $N_i$ represents the minimum bandwidth assigned to the $i^{th}$ traffic class, then $N_1+N_2+N_3+N_4+N_5<N$.

Each minimum bandwidth $N_i$ can be transformed into a timer value, $D_i$, representative of the number of tick intervals T that must elapse for traffic class i to acquire its quantum of bandwidth. The timer value $D_i=(1-/N_i)/T$. Note that $D_i$ may not be an integer value because it represents a ratio of bandwidths, i.e., $D_i=N/N_i$ because $N*T=1$.

Given selected timer values $D_i$ for i=1, 2, 3, 4, 5, a credit accrual routine runs simultaneously with the service routine. Each class of traffic i is assigned a timer $T_i$, which is initialized to the associated timer value, $D_i$. The timer $T_i$ is decremented every T units of time. When the value of timer $T_i$ is less than or equal to zero a transmission credit $C_i$ accrues for traffic class i. Because of the inverse relationship between $N_i$ and $D_i$, the greater the allocated minimum bandwidth for a class of traffic, the faster the rate at which it acquires transmission credit. The presence of a transmission credit permits a cell from traffic class i to be serviced. After servicing of class i, timer $T_i$ is updated by adding $D_i$ to the previous value of $T_i$. Using this method of accrual, each class of traffic i accrues $N_i$ credit in a tick interval of T.

The maximum number of credits, $Cmax_i$, that may be accrued for each class of traffic i is selectable. For one embodiment, the maximum credit that may accrue to any traffic class is 1.

FIG. 14(a) is a flow diagram of the service routine for a single tick interval implemented by queue manager 76. Using a credit based strategy for servicing cell traffic, queue manager 76 guarantees each class of traffic a minimum bandwidth.

At the beginning of the tick interval queue manager 76 initializes the servicing routine at step 400, and at step 402 examines flag $Q_0$ for high priority traffic. If $Q_0=1$, then a cell of high priority traffic is queued at step 404, and queue manager 76 will service a cell of high priority traffic. Thus, it will be understood that no credit is necessary for high priority traffic to be serviced. The only requirement for servicing of high priority traffic is the presence of a cell in the high priority queue.

If, on the other hand, $Q_0=0$ because no cells are present in the high priority queue, then queue manager 76 begins examining the availability of cells and credit for each class. This examination occurs in order of traffic class service priority indicated by index j. Thus, it will be understood that the next step (406) is setting the service order, j=1, by incrementing index j.

In state 408, the queue manager 76 finds class i associated with service order j. For the $i^{th}$ class, found in step 408 queue manager 76 examines the associated boolean flag $Q_i$ in step 410 and the associated credit $C_i$ in step 412. A cell of traffic for class i will be serviced if credit has accrued to that class of traffic and a cell of that class is present in the associated queue. In other words, a cell of traffic from class i will be serviced in step 414 only if $Q_i=1$ and $C_i=1$.

If $Q_i$ or $C_i=0$, no credit is available for class i or no cell is queued for class i, then spare bandwidth results. Consequently, index B, which indicates the number of spare bandwidth credits available is incremented in step 416.

Step 418 checks to see if the priority order index, j, has been exhausted, and if not, returns to step 406 where index j is incremented. If all values of j have been exhausted, step 420 checks to see if $B>0$, indicating that spare bandwidth is available for distribution in accordance with protocol 800 referenced in step 422. Otherwise, the process terminates.

FIG. 14(b) is a flow diagram for the spare bandwidth allocation process 800 which is initiated by setting the spare bandwidth priority index so that k=1. In step 802, the traffic class index, i, is set equal to the value of k. Step 804 checks boolean flag $Q_i$ to see if data is present, and if so, proceeds to step 806 where the credit, $C_i$, is checked. If $C_i=1$, then the $i^{th}$ class is serviced in step 808 and the excess bandwidth index B is decremented in step 810. Step 812 checks if any excess bandwidth remains and, if not, the process ends. If excess bandwidth is not exhausted, or if $Q_i=0$ or $C_i=0$, the process moves to step 814 where index k is incremented. Step 816 checks the value of index k: if k is less than 3, the process returns to step 802; if $3 \leq k \leq 6$, then the process proceeds to step 818; and if k=6, the process moves to step 822.

If $3 \leq k<6$, then one of three possible and equal priority queues may be serviced. In order to ensure fair and equal distribution of excess bandwidth to voice (i=3), bursty (i=4), or multicast (i=5) data, steps 818 and 820 service these three round-robin by incrementing index n (mod 3) in step 818 and setting i=3+n in step 820. The process then proceeds back to step 804. When the process ends because all excess bandwidth has been allocated, index n remains set at its last value. The next time that excess bandwidth obtains after class i=1 and i=2 have been serviced, index n picks up the next round-robin value in step 818.

If the test in step 816 indicates that k=6, all five classes have been serviced. Step 822 tests to see if excess bandwidth still exists and if so, repeats the sequence by initializing the priority index so that k=1 and then proceeds to step 802. Otherwise, the process ends.

The order of allocating spare bandwidth described causes the impact of heavy high priority traffic to be born primarily by bursty data, multicast data and voice data. Correspondingly, low-speed statistical data and high speed statistical are less affected by periods of heavy high priority data.

The described method of allocating spare bandwidth between various traffic classes by TXR 56 is an open-loop control system because the data rate is controlled by the sending node without any feedback from the cell switching network. This procedure leads to a conservative allocation of network resources because each terminal network node acts independently and without specific knowledge of the traffic state of the network. In order to achieve higher bandwidth utilization by bursty traffic, without undo congestion on a given virtual connection, it is necessary to provided the ICA feedback information about the level of bursty traffic being handled by all FRPs involved with a given virtual connection.

ICA is configurable on a per connection basis. The configurable MIR and PIR guarantee that each connection gets at least its minimum allocated bandwidth, independent of other traffic.

System software resident in each process controller 50, implements the user interface and ICA node functions, and further comprises the following functions:
(1) enables/disables the ICA feature on a per node basis;
(2) configures connections using the following parameters:
   MIR: minimum information rate expressed in Kbps which is translated into cells per second for internal node use;
   PIR: peak information rate expressed in Kbps (internal cells per second);
   QIR: quiescent information rate corresponding to the initial rate after a period of ICA inactivity, expressed in Kbps ($MIR \leq Qir \leq PIR$);
   $T_Q$: quiescent information rate (QIR) time-out parameter;
   VCqd: virtual connection maximum queue depth in bytes;
   Bc; committed burst in bytes (ICA only);
   Be: excess burst in bytes (ICA only);
   Cmax: maximum credit count, expressed in cell units and used to ensure fairness of access by guarding against an unreasonable credit count, typically set at Cmax=10 corresponding to two typical frames of five cell each;
   ECNth: virtual connection (VC) queue threshold in bytes for explicit congestion notification (ECN);
   CLPth1,2: cell loss priority thresholds in bytes ($CLPth1 \geq CLPth2$) to control loss of newly arriving cells with CLP bit set at 1(indicating input rates in excess of MIR) are configurable for each TXR;
   TAth: traffic analyzer average c-bit count threshold; and
   PQth: output port transmit queue threshold.
   (All of the above are not independent—(CIR, Bc, Be) or, (CIR, VCqd, PIR) or, (CIR, Bc, PIC), or (CIR, VCqd, Be) may be used interchangeable as optional parameter sets.)
(3) periodically requests a route's RTD measurement from the destination FRP and makes the necessary reconfigurations to perform the measurement;
(4) controls the routing of ICA connections only through ICA-capable nodes; and
(5) collects operating statistics from TXRs and FRPs.

For one embodiment, the two identical TXR queues previously labelled as bursty and multicast are redefined to accommodate the ICA feature. All ICA bursty traffic uses the bursty data queue, while non-ICA bursty data and multicast traffic share the same multicast queue. In this manner, both ICA non-ICA bursty data can be accommodated in the same cell switching network.

Also, for one ICA embodiment, the description of TXR 56 further comprises the following firmware functions:
(1) calculating the ICA average queue depth using the "regeneration cycle" averaging period;
(2) setting the congestion bit (c-bit) in the cell header when congestion is incipient as defined by configuration parameter ECNth;
(3) configuring and setting thresholds for ICA queues using ECNth for setting the c-bit and CLPth 1 and 2 for discarding new excess rate cells with CLP bit set; and
(4) maintaining statistics on the number of cells with c-bits set and the number of cells with CLP-bits set.

FRP 59 firmware provides augmented functions in support of ICA operation comprising:
(1) selectively setting the initial network cell rate at QIR, and varying the cell rate between MIR and PIR in accordance with ICA information received from the destination FRP which, for one embodiment, provides a configurable additive rate increase (+10% of MIR), multiplicative rate decrease ($\frac{7}{8}$ of current rate), or multiplicative fast decrease ($\frac{1}{2}$ of current rate), and also provides for ignoring "increase rate" message if the rate is at PIR, or if there is no offered load in the VC queue (cell transmit queue 236), ignoring "decrease" rate or "fast decrease" rate message if the rate is at MIR, and resetting rate to QIR if traffic is absent over a prescribed period of time;
(2) measuring the adaptive rate adjustment period equal to twice the round trip delay for each connection;
(3) counting the c-bit generated by the last rate change instruction to the source FRP, i.e., after a delay of one RTD and counted over an additional RTD interval or until a cell is ready to be sent back, whichever is longer;
(4) measuring configuration parameter RTD approximately every five seconds for one of each connection being served by generating and sending a HP cell when an RTD measurement is requested by system software, and echoing back to source any RTD measurement HP cell received;
(5) generating a feedback control signal from the filtered or averaged c-bit count, comparing the average count with threshold TAth and sending it back to the source node 22 over the same two way connection in a queued cell or supervisory cell header and coded as follows:
  (a) if less than TAth of the possible c-bits are set, send an "increase rate" adjustment message back to the source node;
  (b) if greater than TAth, send a "decrease rate" adjustment message;
  (c) if a cell loss is detected and some c-bits are set, send a "fast decrease" adjustment message; and
  (d) send a "no-rate-change" message during regeneration cycles while the destination FRP is waiting for the effects of the previous rate change; and (e) send a decrease rate message to the VC source node if the threshold, PQth, of the output port transmit queue 819 associated with that VC is exceeded, even if threshold TAth is not exceeded.

Additional FRP functions operating in conjunction with the external frame relay network comprise:

(1) monitoring incoming traffic rate and setting the CLP bit for all cells generated from frames received at rates exceeding the committed burst, $B_c$;

(2) copying the DE-bit of incoming frames to the CLP-bit of the cell header;

(3) setting the DE-bit of the external frame header using the same criteria as for the CLP-bit of the internal cell header;

(4) configuring FRP 59 so that each frame VC queue length can be thresholded so that if the frame DE-bit is set, incoming frames are discarded when threshold is reached; and (5) configuring each frame transmit port queue 232 with a DE threshold (DEth) so that when reached, incoming frames from muxbus 60 with DE-bit set are discarded.

In order to further explain the operation of the ICA system, a more detailed description of the ICA algorithms follows for counting c-bits and controlling source node transmission rate.

ICA control is based on the detection of incipient congestion at each node traversed by the virtual connection. Incipient congestion obtains whenever the average bursty data queue length in TXR 56 is greater than congestion threshold parameter $ECN^{th}$. The average queue length is based on queue length measurements taken over a regeneration cycle consisting of a busy plus idle interval of the bursty data. If ECNth is exceeded, a c-bit is set in the cell header of the next cell to be transmitted by queue manager 76.

Destination ACP 200 of FRP 59 counts (averages) the c-bits over a RTD interval as shown in FIG. 15. At the end of the averaging period, a rate adjustment message may be sent by the destination FRP 59 through cell transmitter 220 onto muxbus 96 and thence through TXR 56 and the virtual connection to the source FRP 59. The source FRP 59 may adjust the rate once per two RTD delay units of time. Any change in congestion condition on the virtual connection due to a rate adjustment is detected in the average value measurement starting one RTD unit later.

FIG. 16 is a flow diagram that describes the per virtual connection rate (bandwith) change process 500 by which data rate changes imposed on cell transmitter 220 are adjusted by frame receive controller 201. At step 500, the $i^{th}$ bursty channel bandwidth, Ni, is initialized by setting the transmission rate to the quiescent rate, $QIR_i$. Step 504 checks to see if the queue has been inactive for a period of time greater than $T_Q$, a prescribed configuration parameter. But because the channel has just been activated, the process passes on to step 507. Otherwise, it would go to step 506 where the quiescent rate, $QIR_i$, is assigned. If no rate change has been received, test step 507 moves the process back to step 504, forming a wait loop. If a rate change moves the process to step 508 where it is determined if it is a rate increase or decrease.

If it is a rate decrease, step 516 determines if it is a fast decrease due to cell loss at the other terminal FRP 59. If so, the process moves to step 518 where the rate is reduced by a factor of ½, otherwise to step 520 where it is reduced by a moderate factor of ⅞. After either reduction, the process moves to step 522 where it is determined if the reduction resulted in a rate less than the guaranteed minimum, $MIR_i$. If so, the rate is set at $MIR_i$, or otherwise left unchanged and the process moves back to step 504.

If the rate change in step 507 is an increase, the process moves to step 509 where it is determined if data is available, as indicated the boolean flag $Q_i$. If not, no rate increase is made and the process goes back to step 504. If data is available, step 510 increases $N_i$ by the linear increment of 1/10 of $MIR_i$ and then checks (step 512) if the rate exceeds the maximum allowable, $PIR_i$. If so, the rate is set at $PIR_i$, in step 514. In either case, the process returns to step 504.

The credit manager function, resident in cell transmitter 220 determines cell receiver 210's per channel output rate by assigning credits in accordance with the state of congestion and data availability. In the four V.35 port embodiment, each channel is serviced round-robin. The relative priority given to each (up to 252) virtual connections is determined by the bandwidth assignment algorithm in conjunction with the credit manager servicing algorithm as shown in the flow diagram of FIG. 17.

Step 600 initializes the credit process by setting the ith virtual circuit (VC) connection's credit, Ti, equal to Di, where Di=N/Ni or the number of tick intervals, T, that must elapse for VC connection i to acquire access to the cell network. Thus, Di is derived from the current value of Ni generated by bandwidth assignment process 500. Step 602 sets the VC index i=1. The corresponding ith interval, Ti, is decremented by one tick interval, T, in step 604. Test step 606 checks to see if the resulting value of Ti is equal to or less than zero, indicating that a credit should not be added to the $i^{th}$ credit index, Ci, and if so, passes on to step 616, where the round-robin procedure is initiated by incrementing index i. Otherwise, step 608 is invoked by crediting (incrementing) Ci. Step 610 checks if the incremented value of Ci exceeds the upper limit, Cmax, and if so, moves to step 612 where Ci is set equal to Cmax. The process moves on to step 614. Step 614 restores a positive non-zero value to Ti by adding Di to the value obtained from step 604. (In this manner, non-integer values of Ti are accommodated without the loss in precision that would result if Ti were to be rounded to the nearest integer value.) Step 616 leads to test step 618 to see if all of the VC connections have been served, and if so, a wait of one tick period, T, is imposed by step 620 before repeating the process by returning to step 602. Otherwise, the process returns to step 604.

For another embodiment, the wait period, T, may be extended by some multiplicative factor greater than 1 so that the credit manager to accrue credits as often. For example, if a wait of ten tick periods, 10T, is invoked at step 620, complete round-robin servicing by the credit manager would typically occur every millisecond for T=100 us. This would require that step 604 decrement Ti by 10 (Ti=Ti−10), and step 608 increment by 10 (Ci=Ci+10).

FIG. 18 shows the flow diagram for servicing of muxbus cell transmit queue 236 by cell transmitter 220. Step 700 initializes the VC queue index by setting i=1. Step 702 services the ith channel cell transmit queue 236 if Ci≧1 and Qi=1, indicating that data is present in frame buffers 237 at the location indicated by VC queue 236. If not, the process moves to step 706. Step 704 decrements the credit count, Ci, indicating that the queue has been serviced. Step 706 movements the VC index and passes to test step 708 that checks if all VC connections have been attended and if so, passes back to the initial 700 steps. Otherwise, the remaining VC connections are attended by returning to step 702.

In the foregoing specification, the invention has been described with reference to specific exemplary embodiments thereof. It will, however, be clear that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A feedback control system for congestion prevention control on a virtual connection of a cell switching communications network handling bursty traffic, the feedback control system comprising:
   a) a source node for accepting, queuing, and buffering user framed bursty data, for formatting the bursty data into bursty data cells, and for transmitting the bursty data cells over the virtual circuit connection through the cell switching communications network at an incrementally variable controllable transmission rate in response to a rate control signal to avoid congestion, wherein the source node and any intermediate node comprising the virtual connection include means for accepting, queuing, and buffering, the bursty data cells, means for detecting incipient congestion in the virtual connection queues and buffers, means for setting an incipient congestion indicator to a first state if incipient congestion is detected and setting the incipient congestion indicator to a second state if incipient congestion is not detected, and means for forwarding the bursty data cells over the virtual connection together with the incipient congestion indicator; and
   b) a destination node, which is a terminus of the virtual connection, for accepting the bursty data cells and the incipient congestion indicator, for reconstructing, formatting, and outputting the framed bursty data, for monitoring the incipient congestion indicator, for generating the rate control signal based on the incipient congestion indicator, for transmitting the rate control signal back to the source node.

2. The feedback control system of claim 1, wherein the source node further comprises means for accepting data and control cells from the destination node using a same virtual connection between the source node and the destination node.

3. The feedback control system of claim 1 wherein the rate control signal is transmitted in a cell header by the destination node over a same virtual connection between the source node and the destination node.

4. The feedback control system of claim 3, wherein the rate control signal is transmitted in a supervisory cell header if no return cell traffic is available.

5. The feedback control system of claim 1, further comprising means for measuring virtual connection round-trip delay times, wherein the measuring means comprise:
   a) destination node means for generating a high priority (HP) timestamped cell and for transmitting the HP timestamped cell to the source node;
   b) source node means for echoing HP timestamped cell back to the destination node;
   c) means for comparing a time-stamp of the HP timestamped cell with a destination node arrival time to determine round-trip delay time.

6. The feedback control system of claim 1, wherein the source node further comprises:
   a) cell transmitter rate controller that permits a queued bursty data cell to be transmitted only if an accumulated transmission credit is greater than zero and, if transmission is permitted, decrements the accumulated transmission credit.
   b) credit manager for incrementing the accumulated transmission credit each time a prescribed interval of time has elapsed, wherein the prescribed time interval corresponds to a clock period of the assigned cell rate, wherein the accumulated transmission credit is sent to the cell transmitter rate controller.

7. The feedback control system of claim 6, wherein the credit manager further comprises:
   a) means for accepting a maximum credit count configuration parameter; and
   b) means for limiting the accumulated transmission credit to the maximum credit count configuration parameter.

8. The feedback control system of claim 1, wherein the nodes are two-way nodes using a common virtual connection between source and destination nodes.

9. The feedback control system of claim 1 wherein the user framed data includes frames of data, each frame of data including a multiplicity of cells and a header, each cell including a multiplicity of bits, the multiplicity of bits including a cell loss priority (CLP) bit and wherein the means for accepting, queuing and buffering includes a queue for queuing the bursty data cells and wherein the source node further comprises:
   a) means for measuring an instantaneous bit rate of incoming frames of data;
   b) means for comparing the instantaneous bit rate of incoming frames of data against a committed burst size (Bc) and against a minimum information rate (MIR);
   c) means for setting a data expendable (DE) bit included in the header of each frame for each frame of data having an instantaneous bit rate exceeding Bc and MIR; and
   d) means for discarding each frame in which the DE bit is set if the queue length exceeds a threshold length; and
   e) means for copying the DE bit of each frame into the CLP bit of each cell associated with the frame.

10. A feedback control system for congestion prevention control on a virtual connection of a cell switching communications network handling bursty traffic, comprising:
   a) a source node for accepting, queueing, and buffering user framed bursty data, for formatting the bursty data into bursty data cells, and for transmitting the cells over the virtual circuit connection through the cell switching communications network at an incrementally variable controllable transmission rate wherein the source node and any intermediate node comprising the virtual connection include means for accepting, queueing, and buffering the bursty data cells, means for detecting incipient congestion in the virtual connection queues and buffers, and means for forwarding the bursty data cells over the virtual connection together with an associated incipient congestion indicator; and b) a destination node, being the terminus of the communication network virtual connection for accepting the bursty data cells and the associated incipient congestion indicator, for reconstructing, formatting, and outputting the framed bursty data, for monitoring the congestion indicators, for creating a four state, two binary bit, rate control signal representing rate increase, rate decrease, fast rate decrease, and no-rate-change messages based on the congestion indicators, transmitting the rate control signal back to the source node, wherein the incrementally controllable transmission rate of the source node is adjusted in response to the rate control signal sent from the destination node in order to minimize congestion.

11. The feedback control system of claim 10 wherein the means for incrementally controlling the transmission rate is responsive to the four state control signal causing an additive fractional increase in response to a rate increase signal, a large fractional multiplicative factor decrease in response to a rate decrease signal, and a small fractional multiplicative factor rate decrease in response to a fast rate decrease signal.

12. The feedback control system of claim 10 wherein the user framed bursty data includes frames of data, each frame of data including a multiplicity of cells and a header, each cell including a multiplicity of bits, the multiplicity of bits including a cell loss priority (CLP) bit and wherein the means for accepting, queuing and buffering includes a queue for queuing the bursty data cells and wherein the source node further comprises:
   a) means for measuring an instantaneous bit rate of incoming frames of data;
   b) means for comparing the instantaneous bit rate of incoming frames of data against a committed burst size (Bc) and against a minimum information rate (MIR);
   c) means for setting a data expendable (DE) bit included in the header of each frame for each frame of data having an instantaneous bit rate exceeding Bc and MIR; and
   d) means for discarding each frame in which the DE bit is set if the queue length exceeds a threshold length; and
   e) means for copying the DE bit of each frame into the CLP bit of each cell associated with the frame 13. A feedback control system for congestion prevention control on a virtual connection of a cell switching communications network handling bursty traffic, comprising:
   a) a source node for accepting, queueing, and buffering user framed bursty data, for formatting the bursty data into bursty data cells, and for transmitting the cells over the virtual circuit connection through the cell switching communications network at an incrementally variable controllable transmission rate that is variable between a prescribed lower guaranteed minimum rate and an upper maximum rate, the source node and any intermediate node comprising the virtual connection include means for accepting, queueing and buffering the bursty data cells, means for detecting incipient congestion in the virtual connection queues and buffers, and means for forwarding the cells over the network virtual connection together with an associated incipient congestion indicator; and
   b) a destination node being the terminus of the communication network virtual connection having means for accepting the bursty data cells and the associated incipient congestion indicator, for reconstructing, formatting and outputting the framed bursty data, for monitoring the congestion indicators, for creating a rate control signal based on the congestion indicators, for transmitting the rate control signal back to the source node, wherein the incrementally controllable transmission rate of the source node is adjusted in response to the rate control signal sent from the destination node in order to minimize congestion.

14. The feedback control system of claim 13, wherein the rate control further comprises means for assigning an initial quiescent rate between the lower and upper rate.

15. The feedback control system of claim 14, wherein the rate control further comprises means for sensing lack of user input bursty data activity and resetting the rate to the quiescent rate.

16. The feedback control system of claim 13, wherein the rate control means ignores the rate control signal if the user input rate does not create an excess virtual circuit queue load.

17. The feedback control system of claim 13 wherein the user framed bursty data includes frames of data, each frame of data including a multiplicity of cells and a header, each cell including a multiplicity of bits, the multiplicity of bits including a cell loss priority (CLP) bit and wherein the means for accepting, queueing and buffering includes a queue for queuing the bursty data cells and wherein the source node further comprises:
   a) means for measuring an instantaneous bit rate of incoming frames of data;
   b) means for comparing the instantaneous bit rate of incoming frames of data against a committed burst size (Bc) and against a minimum information rate (MIR);
   c) means for setting a data expendable (DE) bit included in the header of each frame for each frame of data having an instantaneous bit rate exceeding Bc and MIR; and
   d) means for discarding each frame in which the DE bit is set if the queue length exceeds a threshold length; and
   e) means for copying the DE bit of each frame into the CLP bit of each cell associated with the frame.

18. A feedback control system for congestion prevention control on a virtual connection of a cell switching communications network handling bursty traffic, the feedback control system comprising:
   a) a source node for accepting, queuing and buffering user framed bursty data, for formatting the bursty data into bursty data cells, and for transmitting the cells over the virtual circuit connection through the cell switching communications network at an incrementally variable controllable transmission rate in response to a rate control signal to minimize congestion, the source node and any intermediate node comprising the virtual connection include means for accepting, queuing and buffering the bursty data cells, means for detecting incipient congestion in the virtual connection queues and buffers by monitoring the average queue length over a regeneration cycle time interval, means for comparing the average queue length to an incipient congestion threshold, means for setting an incipient congestion indicator to a first state when the incipient congestion threshold is exceeded and setting the incipient congestion indicator to a second state when the incipient congestion threhsold is not exceeded, and means for forwarding the cells over the network virtual connection together with the incipient congestion indicator; and b) a destination node being the terminus of the communication network virtual connection having means for accepting the bursty data cells and the incipient congestion indicator, for reconstructing, formatting, and outputting the framed bursty data, for monitoring the incipient congestion indicators, for revising the rate control signal based on the incipient congestion indicators, for transmitting the rate control signal back to the source node.

19. The feedback control system of claim 18, wherein the incipient congestion threshold is set to provide a tolerable delay in combination with a tolerable concomitant cell loss rate.

20. The feedback system of claim 18, further comprising means for discarding cells that arrive while queue length exceeds the incipient congestion threshold.

21. The feedback control system of claim 18, wherein the incipient congestion indicator is encoded in a cell header.

22. The feedback control system of claim 18 wherein the user framed bursty data includes frames of data, each frame of data including a multiplicity of cells and a header, each cell including a multiplicity of bits, the multiplicity of bits including a cell loss priority (CLP) bit and wherein the means for accepting, queuing and buffering includes a queue for queuing the bursty data cells and wherein the source node further comprises:
   a) means for measuring an instantaneous bit rate of incoming frames of data;
   b) means for comparing the instantaneous bit rate of incoming frames of data against a committed burst size (Bc) and against a minimum information rate (MIR);
   c) means for setting a data expendable (DE) bit included in the header of each frame for each frame of data having an instantaneous bit rate exceeding Bc and MIR; and
   d) means for discarding each frame in which the DE bit is set if the queue length exceeds a threshold length; and
   e) means for copying the DE bit of each frame into the CLP bit of each cell associated with the frame.

23. A feedback control system for congestion prevention control on a virtual connection of a cell switching communications network handling bursty traffic, comprising:
   a) a source node for accepting, queueing and buffering user framed bursty data, for formatting the bursty data into bursty data cells, and for transmitting the cells over the virtual circuit connection through the cell switching communications network at an incrementally variable controllable transmission rate, the source node and any intermediate node comprising the virtual connection having means for accepting, queueing and buffering the bursty data cells, means for detecting incipient congestion in the virtual connection queues and buffers, and means for forwarding the cells over the network virtual connection together with an associated incipient congestion indicator; and
   b) a destination node being the terminus of the communication network virtual connection having means for accepting the bursty data cells and the associated incipient congestion indicator, for reconstructing, formatting and outputting the framed bursty data, for counting cells with the associated incipient congestion indicator asserted, for creating a rate control signal based on the cell count, for transmitting the rate control signal back to the source node, wherein the incrementally controllable transmission rate of the source node is adjusted in response to the rate control signal sent from the destination node in order to minimize congestion.

24. The feedback control system of claim 23, wherein the cell count means begins counting after a round-trip delay interval following a transmission of the rate control signal from the destination node to the source node.

25. The feedback control system of claim 23, wherein the means for generating the rate control signal further comprises means for indicating a rate increase if a threshold is not exceeded by an average incipient congestion count, and for indicating a rate decrease if the threshold is exceeded.

26. The feedback control system of claim 23, wherein the means for generating the rate control signal further comprises means for detecting cell loss together with the detection of the average incipient congestion count exceeding threshold, means for indicating a fast reduction when the threshold is exceeded and cell loss in detected.

27. The feedback control system of claim 23, wherein the means for generating the rate control signal indicates no-rate-change for each cell while waiting for the effects on congestion due to a previous transmission of the rate control signal.

28. The feedback control system of claim 23 wherein the user framed bursty data includes frames of data, each frame of data including a multiplicity of cells and a header, each cell including a multiplicity of bits, the multiplicity of bits including a cell loss priority (CLP) bit and wherein the means for accepting, queuing and buffering includes a queue for queuing the bursty data cells and wherein the source node further comprises:
   a) means for measuring an instantaneous bit rate of incoming frames of data;
   b) means for comparing the instantaneous bit rate of incoming frames of data against a committed burst size (Bc) and against a minimum information rate (MIR);
   c) means for setting a data expendable (DE) bit included in the header of each frame for each frame of data having an instantaneous bit rate exceeding Bc and MIR; and
   d) means for discarding each frame in which the DE bit is set if the queue length exceeds a threshold length; and
   e) means for copying the DE bit of each frame into the CLP bit of each cell associated with the frame.

29. A feedback control system for congestion prevention control on a virtual connection of a cell switching communications network handling bursty traffic, comprising:
   a) a source node for accepting, queueing and buffering user framed bursty data, for formatting the bursty data into bursty data cells, for indicating those cells derived from user input data received at rates exceeding a prescribed guaranteed minimum rate, and for transmitting the cells together with the indicators over the virtual circuit connection through the cell switching communications network at an incrementally variable controllable transmission rate, the source node and any intermediate node comprising the virtual connection having means for accepting, queueing and buffering the bursty data cells, means for detecting incipient congestion in the virtual connection queues and buffers, and means for forwarding the cells over the network virtual connection together with an associated incipient congestion indicator; and b) a destination node being the terminus of the communication network virtual connection having means for accepting the bursty data cells and the associated incipient congestion indicator, for reconstructing, formatting and outputting the framed bursty data, means for monitoring the congestion indicators, for creating a rate control signal based on the congestion indicators, means for transmitting the rate control signal back to the source node, wherein the incrementally controllable transmission rate of the source node is adjusted in response to the rate control signal sent from the destination node in order to minimize congestion.

30. The feedback control system of claim 29, wherein the means for indicating those cells derived from user input frames rates exceeding a prescribed guaranteed minimum rate further comprises means for encoding the indications in the cell header.

31. The feedback control system of claim 29, wherein the source node and any intermediate node further comprises means for discarding the cells which have been indicated as being derived from input data exceeding the minimum guaranteed rate whenever the virtual connection queues exceed a prescribed cell loss priority threshold length.

32. The feedback control system of claim 31, wherein the means for discarding cells discards all cells belonging substantially to a same data frame as that which was being queued when the prescribed cell loss threshold length was exceeded.

33. A feedback control system for congestion prevention control on a virtual connection of a cell switching communications network handling bursty traffic, comprising:

a) a source node for accepting, queueing and buffering user framed bursty data including an associated expendable data indicator that indicates an excess input frame data rate, for formatting the bursty data into bursty data cells, for encoding the expendable data indicator in the cell header, for discarding cells bearing the indicator for relief of congestion, and for transmitting the non-discarded cells over the virtual circuit connection through a cell switching communications network at an incrementally variable controllable transmission rate, the source node and any intermediate nodes comprising the virtual connection having means for accepting, queueing and buffering the bursty data cells, means for detecting incipient congestion in the virtual connection queues and buffers, and means for forwarding the cells over the network virtual connection together with an associated incipient congestion indicator; and b) a destination node being the terminus of the communication network virtual connection having means for accepting the bursty data cells and the associated incipient congestion indicator, for reconstructing, formatting and outputting the framed bursty data, for monitoring the congestion indicators, for creating a rate control signal based on the congestion indicators, means for transmitting the rate control signal back to the source node, wherein the incrementally controllable transmission rate of the source node is adjusted in response to the rate control signal sent from the destination node in order to minimize congestion.

34. The feedback control system of claim 33, wherein the source node and any intermediate node further comprises means for discarding cells associated with the expendable data indicator.

35. The feedback control system of claim 33, wherein the destination node further comprises:
 a) at least one output queue for buffering reconstructed data frames;
 b) means for monitoring the output queue length;
 c) means for comparing the output queue length with a prescribed threshold; and
 d) means for discarding the reconstructed bursty data frames having an associated asserted expendable data indicator whenever the prescribed output queue threshold is exceeded.

36. The feedback control system of claim 35, further comprising:
 a) means for calculating an average queue length of the port transmit queue associated with the virtual connection;
 b) means for comparing the average output port transmit queue length with a prescribed average output port transmit queue length threshold; and
 c) means for generating a rate decrease signal if the average output port transmit queue length threshold is exceeded.

37. The feedback control system of claim 36, wherein the average output queue length is computed over a regeneration cycle time interval.

38. A feedback control method for congestion prevention on a virtual circuit connection of a cell switching network handling bursty data traffic, the method comprising the steps of:
 a) queuing and buffering user bursty data frames at an input source node;
 b) formatting the bursty data frames into bursty data cells;
 c) queuing and buffering the bursty data cells within the input source node and intermediate nodes, for transmission to a next node of the virtual connection;
 d) detecting incipient congestion of the bursty data cells that are buffered and queued for transmission to the next node by monitoring queue lengths;
 e) setting an incipient congestion indicator to a first state when incipient congestion is detected;
 f) setting the incipient congestion indicator to a second state when incipient congestion is not detected;
 g) associating the incipient congestion indicator with corresponding cells that are contributing to the incipient congestion;
 h) transmitting the cells and incipient congestion indicators to the destination node over a virtual circuit connection at a controllable rate;
 i) incrementally controlling the transmission rate of bursty cells in response to a rate control signal so as to control congestion;

j) reconstructing frames at the destination node from received bursty cells;

k) monitoring the congestion indicators at the destination node for determining a congestion status of the virtual connection;

l) revising the rate control signal based on the congestion status; and m) transmitting the rate control signal to the source node.

39. The feedback control method of claim 38, wherein the step of revising the rate control signal based on the congestion status comprises generating a four state, two binary bit, signal representing rate increase, rate decrease, fast rate decrease, and no-rate-change.

40. The feedback control method of claim 39, wherein the step of incrementally controlling the transmission rate of bursty cells is in response to the four state control signal causing an additive fractional increase in response to rate increase signal, a moderate fractional multiplicative factor decrease in response to a rate decrease signal, a large fractional multiplicative factor decrease in response to a fast decrease signal, and no rate change in response to a no-rate-change signal.

41. The feedback control method of claim 40, wherein the step of incrementally controlling the transmission rate of bursty cells includes maintaining the transmission rate between a lower guaranteed minimum rate and an upper maximum rate.

42. The feedback control method of claim 41 wherein the step of incrementally controlling the transmission rate of bursty cells includes assigning an initial transmission rate that is between the lower guaranteed rate and upper maximum rate.

43. The feedback control method of claim 41, wherein the step of controlling the transmission rate of bursty cells includes sensing a lack of user input bursty data activity, causing the transmission rate to be reset to a prescribed quiescent rate.

44. The feedback control method of claim 41, wherein the step of incrementally controlling the transmission rate of bursty cells includes ignoring the rate increase signal if the user input rate does not create an excess virtual circuit queue load.

45. The feedback control method of claim 41, wherein the step of incrementally controlling the transmission rate of bursty cells further comprises the following steps:

a) determining the assigned inner-cell interval corresponding to the assigned virtual circuit transmission rate expressed in queue server tick intervals:

b) decrementing the assigned interval each base rate period;

c) incrementing a transmission credit counter whenever the decremented assigned interval is equal to or less than zero, and renewing the decremented assigned interval by adding to it the prior assigned interval thereby creating a new assigned interval for user in step(b);

d) transmitting bursty cells at queue server tick intervals whenever the transmission credit count is greater than zero and a bursty cell is queued for transmission; and e) decrementing the credit counter whenever a bursty cell is transmitted.

46. The feedback control method of claim 45, further comprising the step of limiting the transmission credit counter to a prescribed maximum count.

47. The feedback control method of claim 38, further comprising the following additional steps:

(a) monitoring the average length of any output port transmit queue associated with the bursty cell virtual connection;

(b) comparing the average queue length to a configurable queue length threshold value; and (c) generating a rate decrease signal if the threshold level is exceeded.

* * * * *